(12) United States Patent
Lu et al.

(10) Patent No.: US 7,983,063 B2
(45) Date of Patent: Jul. 19, 2011

(54) MAGNETIC INTEGRATED CIRCUIT FOR MULTIPHASE INTERLEAVED FLYBACK CONVERTER AND CONTROLLING METHOD THEREOF

(75) Inventors: Zengyi Lu, Shanghai (CN); Wei Chen, Shanghai (CN); Ming Hsien Peng, Tao-Yuan Hsien (TW)

(73) Assignee: Delta Electrronics, Inc., Taoyuan Hsien (TW)

( * ) Notice: Subject to any disclaimer, the term of this patent is extended or adjusted under 35 U.S.C. 154(b) by 540 days.

(21) Appl. No.: 12/098,684

(22) Filed: Apr. 7, 2008

(65) Prior Publication Data

US 2009/0046486 A1 Feb. 19, 2009

(30) Foreign Application Priority Data

Aug. 16, 2007 (TW) .............................. 96130389 A

(51) Int. Cl.
*H02M 3/335* (2006.01)
*H02J 1/10* (2006.01)
(52) U.S. Cl. .................. 363/65; 363/21.12; 363/39

(58) Field of Classification Search .................. 363/16, 363/21.12, 65, 71, 97, 131, 39, 45
See application file for complete search history.

(56) References Cited

U.S. PATENT DOCUMENTS

| 4,914,561 | A | * | 4/1990 | Rice et al. ..................... 363/126 |
| 5,508,903 | A | * | 4/1996 | Alexndrov ....................... 363/16 |
| 5,796,595 | A | * | 8/1998 | Cross ............................. 363/71 |
| 6,031,747 | A | * | 2/2000 | Ilic et al. ......................... 363/71 |

* cited by examiner

*Primary Examiner* — Gary L Laxton
(74) *Attorney, Agent, or Firm* — Volpe and Koenig, P.C.

(57) ABSTRACT

The configurations of an interleaved flyback converter and a controlling method thereof are provided. The proposed two-phase interleaved flyback converter includes a transformer including a first primary winding having a first terminal, a first secondary winding having a first terminal, a second primary winding having a second terminal, a second secondary winding having a second terminal and a magnetic coupled core device, wherein the first primary, the first secondary, the second primary and the second secondary windings are wound therein, and the first terminal of the first primary winding has a polarity the same as that of any of the first terminal of the first secondary winding, the second terminal of the second primary winding and the second terminal of the second secondary winding so as to eliminate a ripple of a channel current of the converter.

15 Claims, 24 Drawing Sheets

MAGNETIC INTEGRATED CIRCUIT FOR MULTIPHASE INTERLEAVED FLYBACK CONVERTER AND CONTROLLING METHOD THEREOF

FIELD OF THE INVENTION

The present invention relates to a magnetic integrated circuit of a two-phase interleaved flyback converter and a controlling method of a multiphase interleaved flyback converter. More particularly, the present invention relates to a multiphase interleaved flyback converter having a transformer with a plurality of primary windings and a plurality of secondary windings.

BACKGROUND OF THE INVENTION

Flyback converters relatively posses the advantages of having simple configuration and lower costs, and have been broadly applied to the apparatuses such as adapters etc. As shown in FIG. 1(a), it is a circuit diagram of a flyback converter in the prior art. In which, the flyback converter includes a transformer T, a switch SW, a diode D and an output capacitor C receiving a DC input voltage Vin and an output voltage Vout. FIG. 1(b) shows a schematic circuit diagram of a flyback converter having a magnetic core (mc) in the prior art. In which, the magnetic core mc has an air gap g, the transformer T includes a primary winding Np and a secondary winding Ns. The operational principles are: 1. a current flows through Np when the switch SW is turned on, the diode D is cut off, and then the energy stores in the transformer T; and 2. the diode D is turned on when the switch SW is turned off, and then the energy is released to the output. But the aforementioned flyback converter has the disadvantages: the energy transmission capability is inferior, the input/output ripples are relatively larger, the utilization ratio of magnetic core is low, and the winding loss is larger (especially the transformer's air gap fringing loss), thus the flyback converter is not preferred in the high power applications. The flyback converter can be viewed as the simplest magnetic integrated circuit/structure of the isolated converters. When the trend is increasing the output power and the power density, the flyback converter no longer fits in the requirements for the development of power sources.

Therefore, the interleaved flyback converters having the advantages of possessing lower input/output ripples, increasing the energy transmitting capability and enhancing the output power are proposed and employed. As shown in FIG. 2(a), it is a circuit diagram of an interleaved flyback converter in the prior art, includes a first transformer T1 (the polarity of the first terminal of its primary winding Np1 is the same as the polarity of the first terminal of its secondary winding Ns1), a second transformer T2 (the polarity of the first terminal of its primary winding Np2 is also the same as the polarity of the first terminal of its secondary winding Ns2), a first switch SW1, a second switch SW2, a first diode D1, a second diode D2 and an output capacitor C, the converter is used to receive a DC input voltage Vin and generate an output voltage Vout, the primary and secondary windings Np1 and Ns1 of the first transformer T1, and the primary and secondary windings Np2 and Ns2 of the second transformer T2 are shown. In FIG. 2(b), it is a circuit diagram of an interleaved flyback converter having two magnetic cores (mc1 and mc2) in the prior art. In which, is1 is the current flowing through the first secondary winding Ns1, is2 is the current flowing through the second secondary winding Ns2, ip1 is the current flowing through the first primary winding Np1, ip2 is the current flowing through the second primary winding Np2, the first switch SW1 has a driving voltage Vg1, the second switch has a driving voltage Vg2, and the remaining part is the same as that of FIG. 2(a). Please refer to FIG. 3, which is a waveform diagram of the voltages (Vg1 and Vg2) across the first and second switches (SW1 and SW2), currents (ip1 and ip2) flowing through the primary windings (Np1 and Np2), currents (is1 and is2) flowing through the secondary windings (Ns1 and Ns2), and the converter's output current (iout) of the interleaved flyback converter as shown in FIG. 2(b) respectively.

For the above-mentioned interleaved flyback converters, the current ripples on each of the channels are not improved, and this becomes an important obstacle for increasing the efficiency and decreasing the volume of the power sources. When the changing trend is increasing the density and decreasing the operating voltages of electronic apparatuses in the IC, it is necessary to study how to decrease the current ripples on each channel of the aforementioned interleaved flyback converters. And, the light load loss of the electronic apparatuses such as the adapters is also one of the problems to be solved by the present invention.

Keeping the drawbacks of the prior arts in mind, and employing experiments and research full-heartily and persistently, the applicant finally conceived a magnetic integrated circuit for a multiphase interleaved flyback converter and a controlling method thereof.

SUMMARY OF THE INVENTION

It is therefore an object of the present invention to provide a multiphase interleaved flyback converter and a controlling method thereof to further enhance the original functions of the interleaved flyback converter and to increase the power level on the occasions of its applications so as to dramatically decrease the air gap fringing losses, increase the utilization ratio of magnetic core, and keep the original advantage of having the parallelized multi-channel of the interleaved flyback converter.

According to the first aspect of the present invention, the two-phase interleaved flyback converter includes a transformer including a first primary winding having a first terminal selectively connect to a DC power source, a first secondary winding having a first terminal connect to an output capacitor via a first power switch, a second primary winding having a second terminal selectively connect to the DC power source, a second secondary winding having a second terminal connect to the output capacitor via a second power switch and a magnetic coupled core device, wherein the first primary, the first secondary, the second primary and the second secondary windings are wound therein, and the first terminal of the first primary winding has a polarity the same to any of the first terminal of the first secondary winding, the first terminal of the second primary winding and the second terminal of the second secondary winding so as to eliminate a ripple of a channel current of the converter.

Preferably, the converter further comprises an output capacitor having a first and a second terminals, wherein the first primary winding further comprises a second terminal, the first secondary winding further comprises a second terminal, the second primary winding further comprises a first terminal, the second secondary winding further comprises a first terminal, the first terminal of the output capacitor is grounded, and the second terminal of the output capacitor is coupled to the second terminals of the first and the second secondary windings.

Preferably, the first terminals of the first and the second primary windings receive a DC input voltage, and the output capacitor outputs an output voltage.

Preferably, the converter further comprises a first main circuit of a first flyback converter and a second main circuit of a second flyback converter, wherein the first main circuit comprises the first primary winding, the first secondary winding, a first switch having a first and a second terminals and a first diode having an anode and a cathode, the second main circuit comprises the second primary winding, the second secondary winding, a second switch having a first and a second terminals and a second diode having an anode and a cathode, the second terminal of the first primary winding is coupled to the first terminal of the first switch, the second terminal of the first switch is grounded, the first terminal of the second primary winding is coupled to the first terminal of the first primary winding, the second terminal of the second primary winding is coupled to the first terminal of the second switch, the second terminal of the second switch is grounded, the first terminal of the first secondary winding is coupled to the cathode of the first diode, the anode of the first diode is coupled to the first terminal of the output capacitor, the second terminal of the first secondary winding is coupled to the second terminal of the output capacitor, the first terminal of the second secondary winding is coupled to the cathode of the second diode, the anode of the second diode is coupled to the first terminal of the output capacitor, and the second terminal of the second secondary winding is coupled to the second terminal of the output capacitor.

Preferably, the first switch has a first control signal and the second switch has a second control signal, and a phase-shift angle between the first and second control signals is 180 degrees.

Preferably, the core device comprises a magnetic core having a first and a second core legs, wherein the first core leg is mounted with the first primary and the first secondary windings, the first core leg has a first air gap, the second core leg has a second air gap, and the second core leg is mounted with the second primary and the second secondary windings.

Preferably, the core device comprises a magnetic core having a first to a third core legs, the first core leg is mounted with the first primary and the first secondary windings, the first core leg has the first air gap, the second core leg has the second air gap, the third core leg has the third air gap, and the third core leg is mounted with the second primary and the second secondary windings.

Preferably, the core device comprises a magnetic core having a first to a fourth core legs, the second core leg is mounted with the first primary and the first secondary windings, the third core leg is mounted with the second primary and the second secondary windings, and the first core leg has a first air gap and the fourth core leg has a second air gap for storing energies transmitted by the transformer.

Preferably, the core device comprises two magnetic cores, each of the magnetic cores has a first and a second core legs, the second core leg of the first magnetic core and the first core leg of the second magnetic core are mounted with the first primary and the first secondary windings, the second core leg of the second magnetic core is mounted with the second primary and the second secondary windings.

Preferably, the core device comprises a first to a third magnetic cores, each of the magnetic cores has a first and a second core legs, the second core leg of the first magnetic core and the first core leg of the second magnetic core are mounted with the first primary and the first secondary windings, the second core leg of the second magnetic core and the first core leg of the third magnetic core are mounted with the second primary and the second secondary windings, the second core leg of the first magnetic core has a first air gap, and the first core leg of the third magnetic core has a second air gap.

According to the second aspect of the present invention, the controlling method for a multiphase interleaved flyback converter includes the steps of: providing the converter with a transformer having a plurality of primary windings, each of which has a first terminal selectively connect to a DC power source and a second terminal, a plurality of secondary windings, each of which has a first terminal connect to an output capacitor via a power switch and a second terminal, and a plurality of main circuits of flyback converters, each of which has the primary and the secondary windings; and making the first terminal of the primary winding of a first one of the flyback converters has a polarity the same as that of any of the first terminal of the secondary winding of the first one of the flyback converters and all the second terminals of the primary and the secondary windings of the remaining flyback converters so as to eliminate a ripple of a channel current of the transformer.

Preferably, each the main circuit further comprises a switch and at least one magnetic core having at least two core legs.

According to the third aspect of the present invention, the two-phase interleaved flyback converter includes a first flyback converter having a first primary and a first secondary windings and a second flyback converter having a second primary and a second secondary windings, wherein the secondary winding of the second flyback converter generates an output current when a current on the primary winding of the first flyback converter is relatively increased.

Preferably, the converter further comprises a magnetic core having a first and a second core legs, wherein the first primary and the first secondary windings are wound on the first core leg and the second primary and the second secondary windings are wound on the second core leg.

Preferably, each of the first and the second flyback converters further comprises a power switch coupled between an external DC power source and the respective primary winding thereof, a rectifier output circuit and an output capacitor coupled between the respective secondary winding thereof and the rectifier output circuit.

The present invention may best be understood through the following descriptions with reference to the accompanying drawings, in which:

DETAILED DESCRIPTION OF THE PREFERRED EMBODIMENT

Figure 4A:
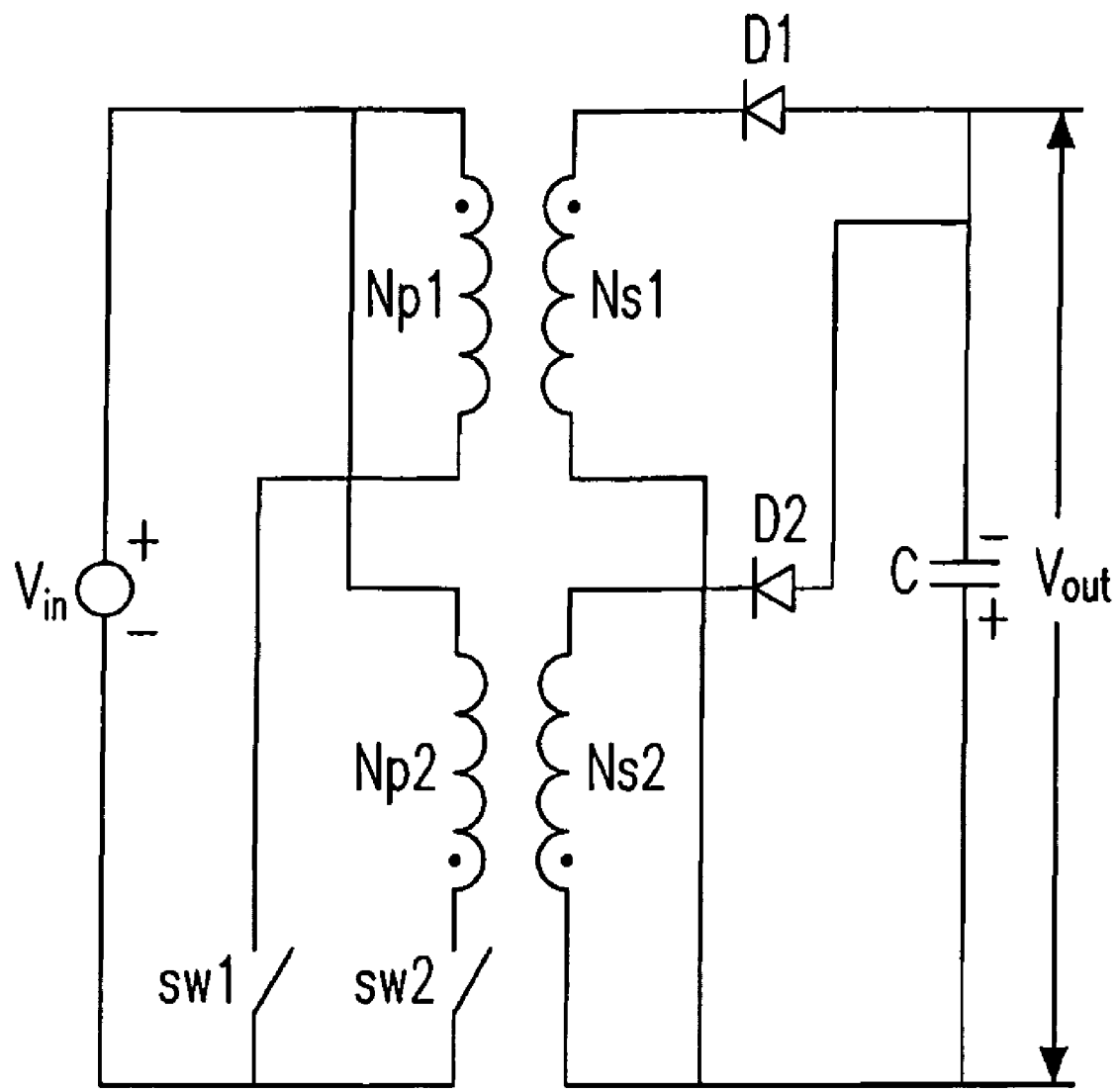
FIG. 4(a) shows a circuit diagram of a two-phase interleaved flyback converter according to the first preferred embodiment of the present invention.

Please refer to FIG. 4(a), which shows a circuit diagram of a two-phase interleaved flyback converter according to the first preferred embodiment of the present invention. Which shows a first primary winding Np1 and a first secondary winding Ns1 of a transformer (not shown), and the first terminals of windings Np1 and Ns1 have the same polarity; a second primary winding Np2 and a second secondary winding Ns2, and the second terminals of windings Np2 and Ns2 also have the same polarity as that of the first terminal of the first primary winding Np1 such that the current ripples on each channel are eliminated; it further includes a first switch SW1, a second switch SW2, a first diode D1, a second diode D2 and an output capacitor C, and the converter is employed to receive a DC input voltage Vin and generate an output voltage Vout.

Figure 1A:
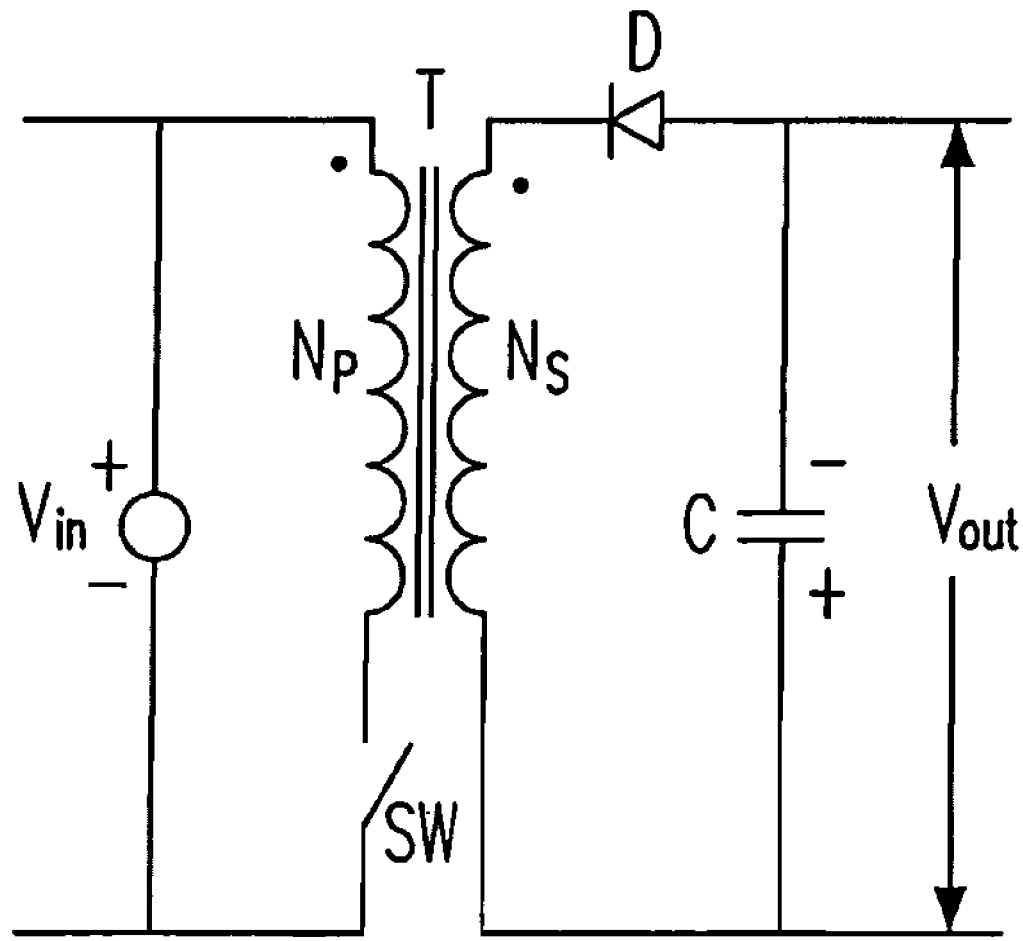
FIG. 1(a) shows a circuit diagram of a flyback converter in the prior art.
Figure 1B:
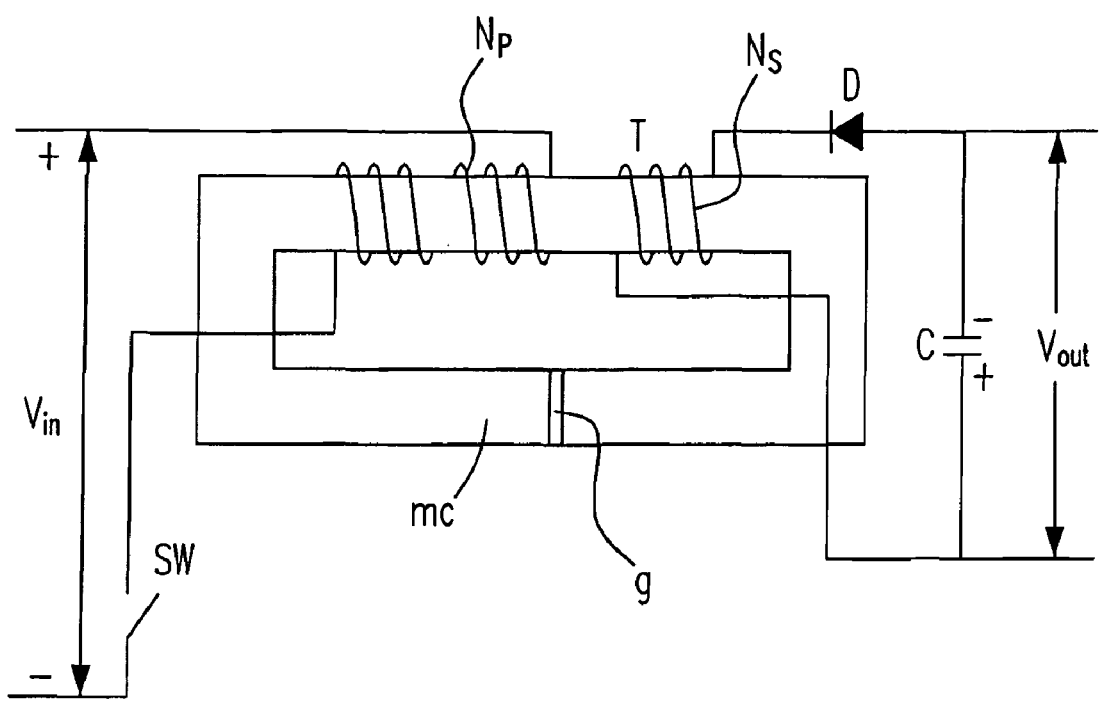
FIG. 1(b) shows a schematic circuit diagram of a flyback converter having a magnetic core in the prior art.
Figure 2A:
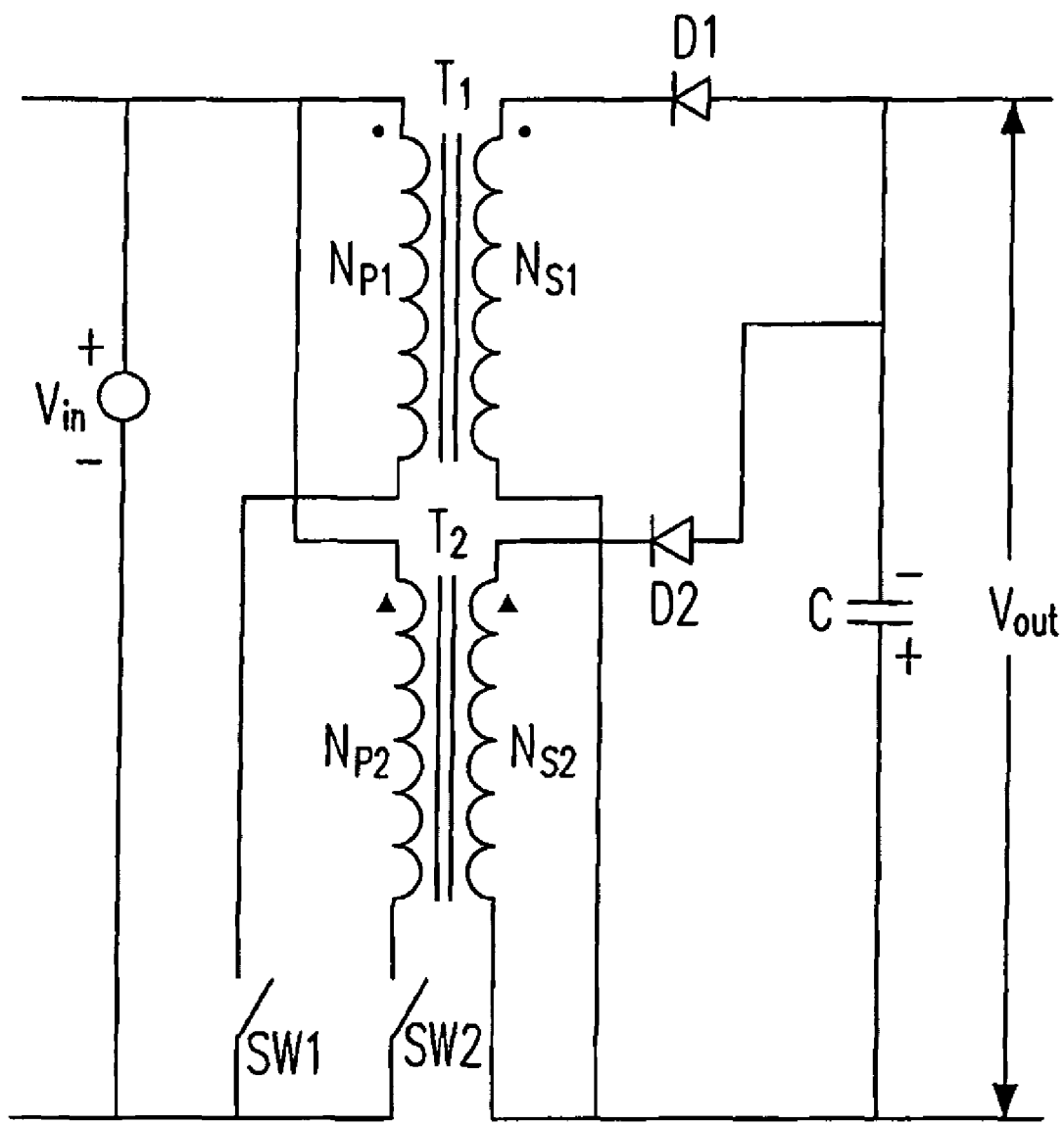
FIG. 2(a) shows a circuit diagram of an interleaved flyback converter in the prior art.
Figure 2B:
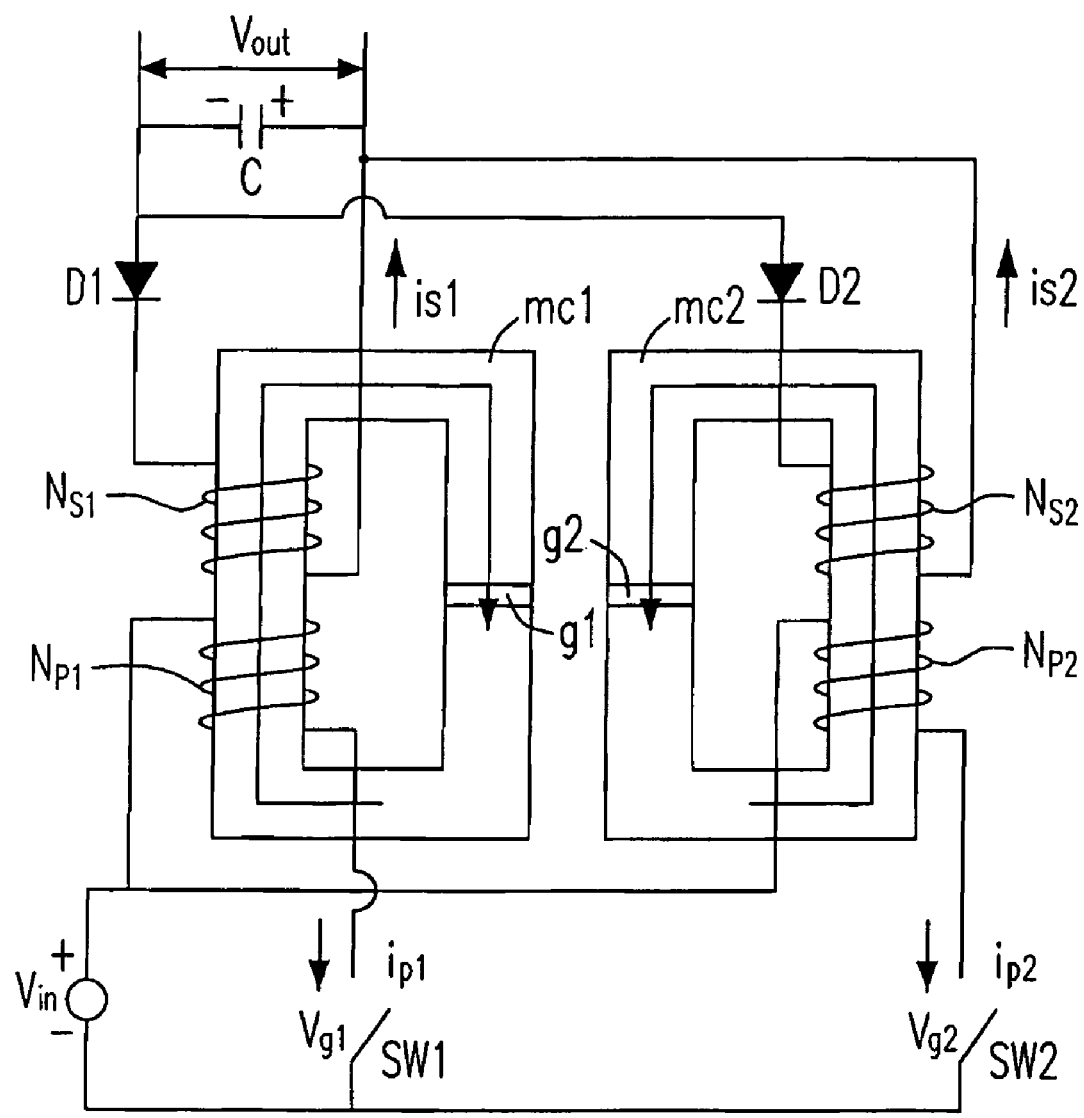
FIG. 2(b) shows a schematic circuit diagram of an interleaved flyback converter having two magnetic cores in the prior art.
Figure 4B:
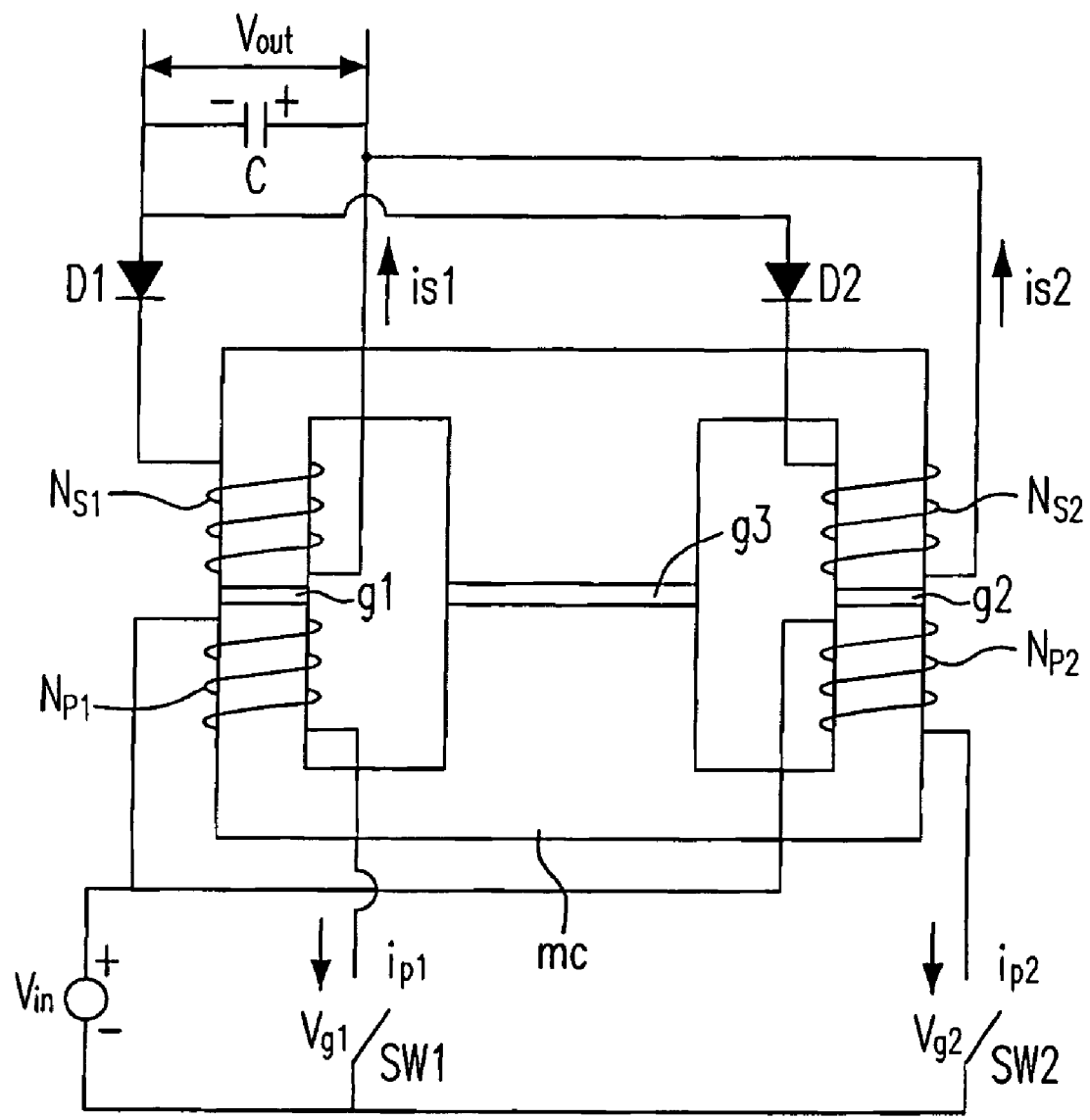
FIG. 4(b) shows a schematic circuit diagram of the two-phase interleaved flyback converter according to the first preferred embodiment of the present invention.

FIG. 4(b) shows a schematic circuit diagram of the two-phase interleaved flyback converter according to the first preferred embodiment of the present invention, which differs from FIG. 4(a) in that the converter further includes a magnetic core mc having a first to a third core legs. In which the first core leg is mounted with the first primary winding Np1 and the first secondary winding Ns1, each of the first to the third core legs has a respective air gap g1-g3, and the third core leg is mounted with the second primary winding Np2 and the second secondary winding Ns2. One with an ordinary skill in the art would know that $V_{out}/V_{in}=D/(n(1-D))$, in which D is a duty ratio, and n is a turns ratio. Respectively, the currents (ip1 and ip2) flowing through the primary windings (NP1 and Np2) of the interleaved flyback converter having a magnetic coupled core proposed by the present invention (as shown in FIG. 4(b)) and the interleaved flyback converter without a magnetic coupled core (as shown in FIG. 2(b)) have a relationship of $i_c/i_{non-c}=(0.5-D)/(1-D)$, in which ic is the current of the interleaved flyback converter having the magnetic coupled core, inon-c is the current of the interleaved flyback converter without the magnetic coupled core, and D is a duty ratio.

Figure 5A:
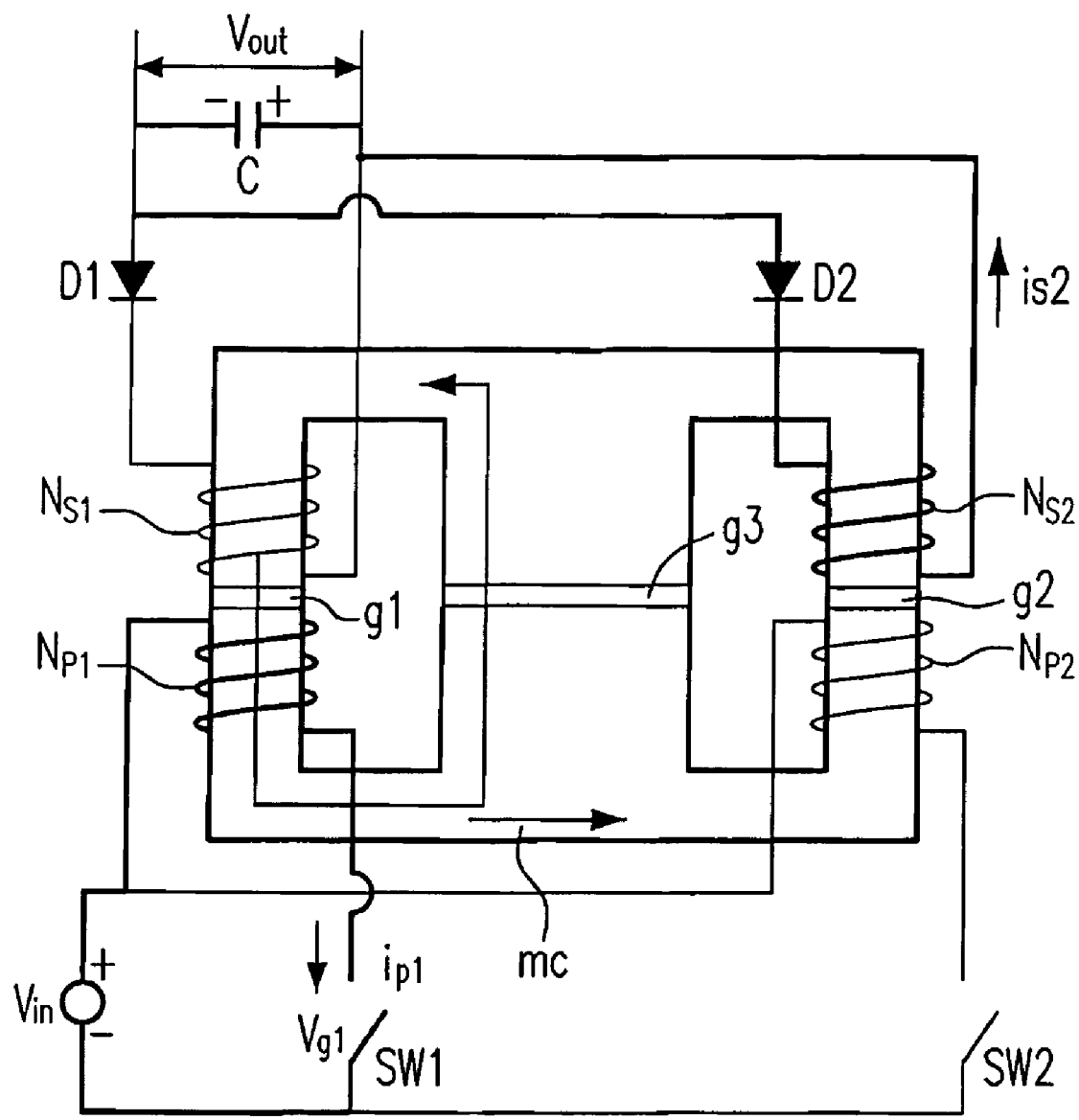
FIG. 5(a) shows a schematic circuit diagram of the two-phase interleaved flyback converter under the operational mode 1 according to the first preferred embodiment of the present invention.

FIG. 5(a) shows a schematic circuit diagram of the two-phase interleaved flyback converter under the operational mode 1 according to the first preferred embodiment of the present invention. At this time moment, the switch SW1 is turned on, the switch SW2 is cut off, the diode D1 is cut off, the diode D2 is conductive, the current ip1 flows through the winding Np1, and the current is2 flows through the winding Ns2. The loop of winding Ns2, diode D2 and capacitor C is conductive (having the current is2), and the loop of winding Np1 and switch SW1 is conductive too (having the current is2).

Figure 5B:
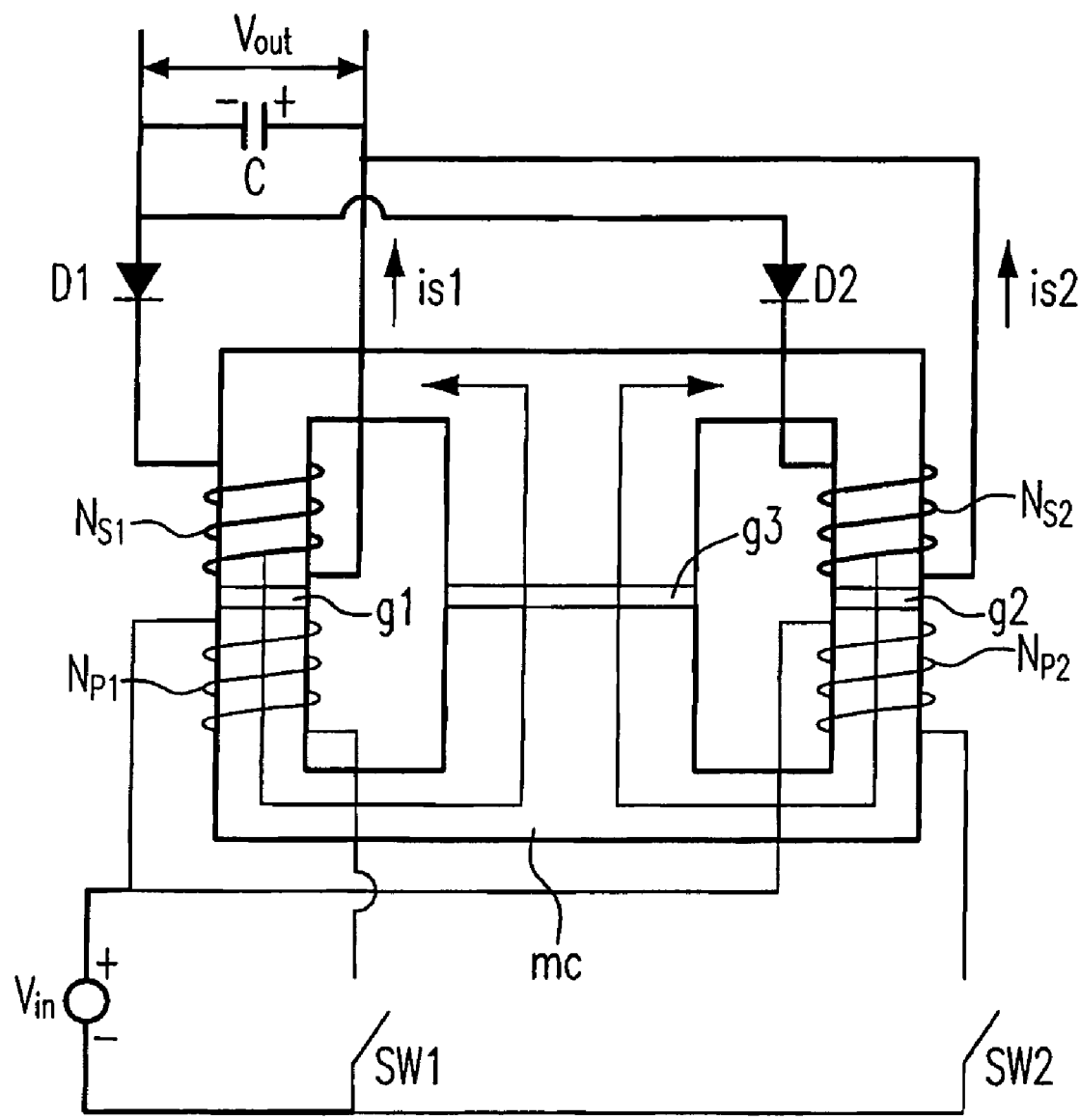
FIG. 5(b) shows a schematic circuit diagram of the two-phase interleaved flyback converter under the operational mode 2 according to the first preferred embodiment of the present invention.

FIG. 5(b) shows a schematic circuit diagram of the two-phase interleaved flyback converter under the operational mode 2 according to the first preferred embodiment of the present invention. At this time moment, the switches SW1 and SW2 are cut off, the diodes D1 and D2 are conductive and the continuation currents of is1 and is2 flow through the diodes D1 and D2 respectively. The loop of winding Ns1, diode D1 and capacitor C is conductive (having the current is1), and the loop of winding Ns2, diode D2 and capacitor C is conductive also (which has the current ip2, and the switch SW2 has a cross voltage of Vg2).

Figure 5C:
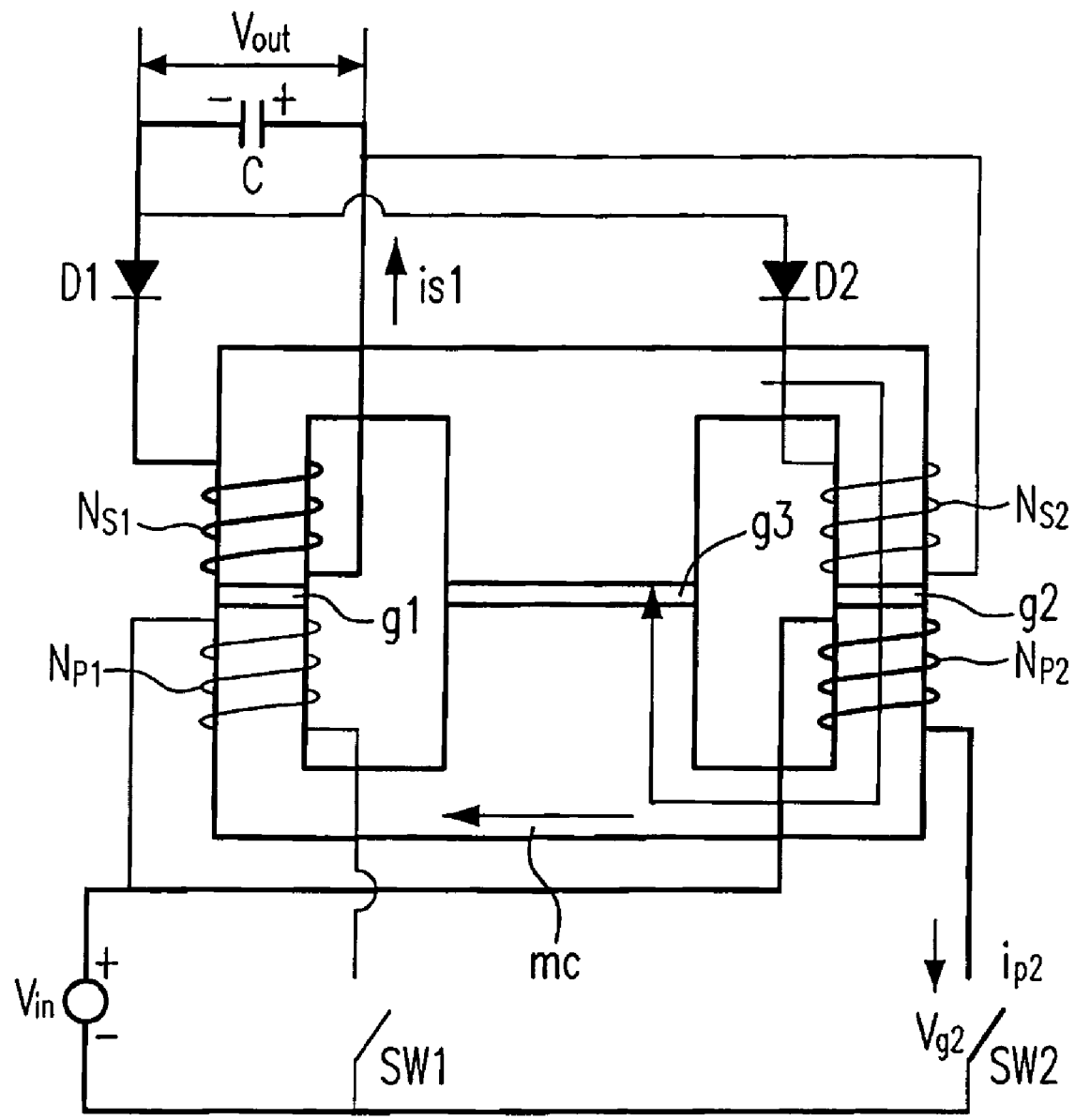
FIG. 5(c) shows a schematic circuit diagram of the two-phase interleaved flyback converter under the operational mode 3 according to the first preferred embodiment of the present invention.

FIG. 5(c) shows a schematic circuit diagram of the two-phase interleaved flyback converter under the operational mode 3 according to the first preferred embodiment of the present invention. At this time moment, the switch SW2 is turned on, the switch SW1 is cut off, the diode D2 is cut off, the diode D1 is conductive, the current ip2 flows through the winding Np2, and the current is1 flows through the winding Ns1. The loop of winding Ns1, diode D1 and capacitor C is conductive (having the current is1), and the loop of winding Np2 and switch SW2 is conductive too (which has the current ip2, and the switch SW2 has a driving voltage of Vg2).

Figure 5D:
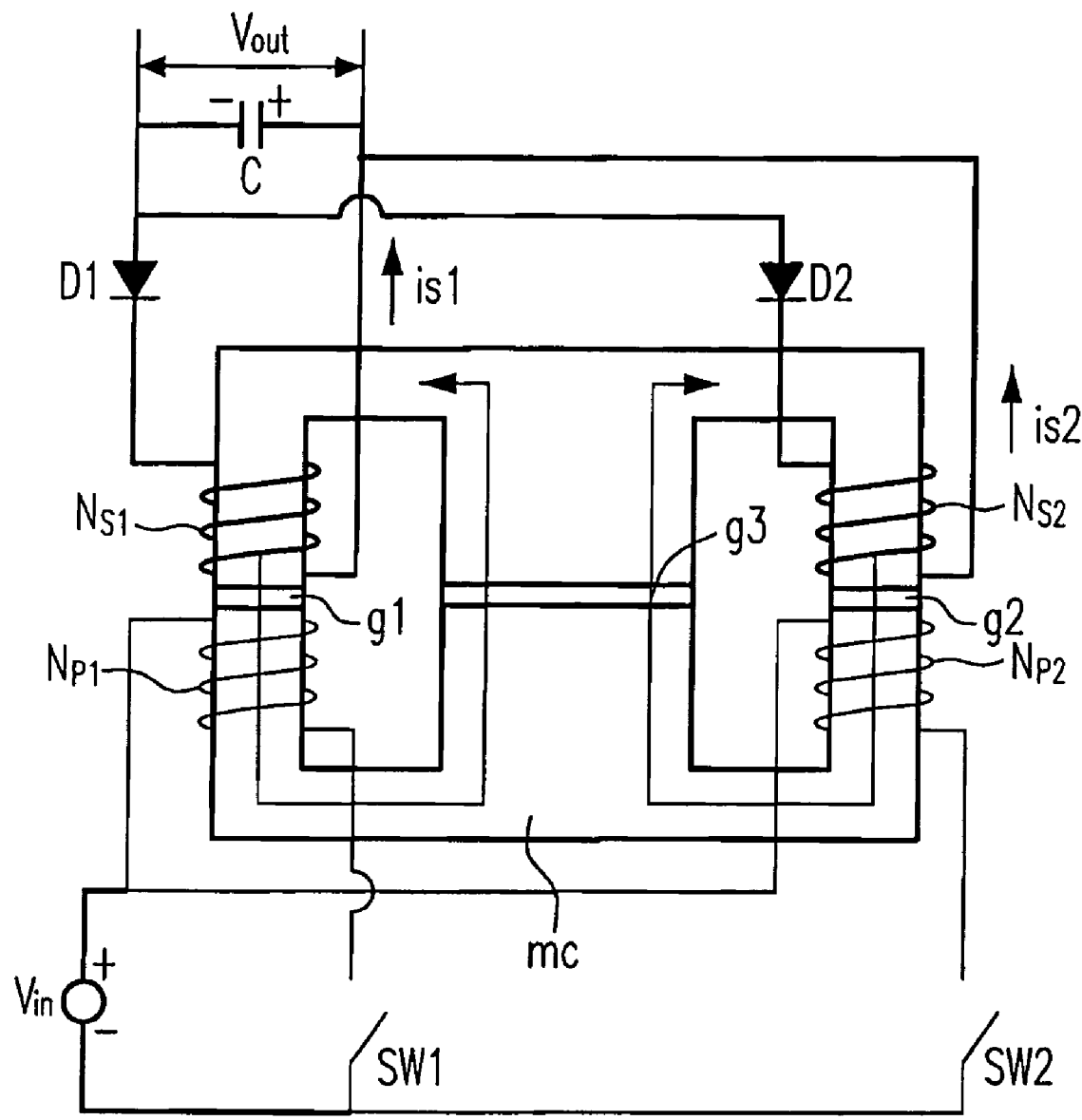
FIG. 5(d) shows a schematic circuit diagram of the two-phase interleaved flyback converter under the operational mode 4 according to the first preferred embodiment of the present invention.

FIG. 5(d) shows a schematic circuit diagram of the two-phase interleaved flyback converter under the operational mode 4 according to the first preferred embodiment of the present invention. At this time moment, the switches SW1 and SW2 are cut off, the diodes D1 and D2 are conductive, and the continuation currents of is1 and is2 flow through the diodes D1 and D2 respectively. The loop of winding Ns1, diode D1 and capacitor C is conductive (having the current is1), and the loop of winding Ns2, diode D2 and capacitor C is conductive too (having the current is2).

Figure 3:
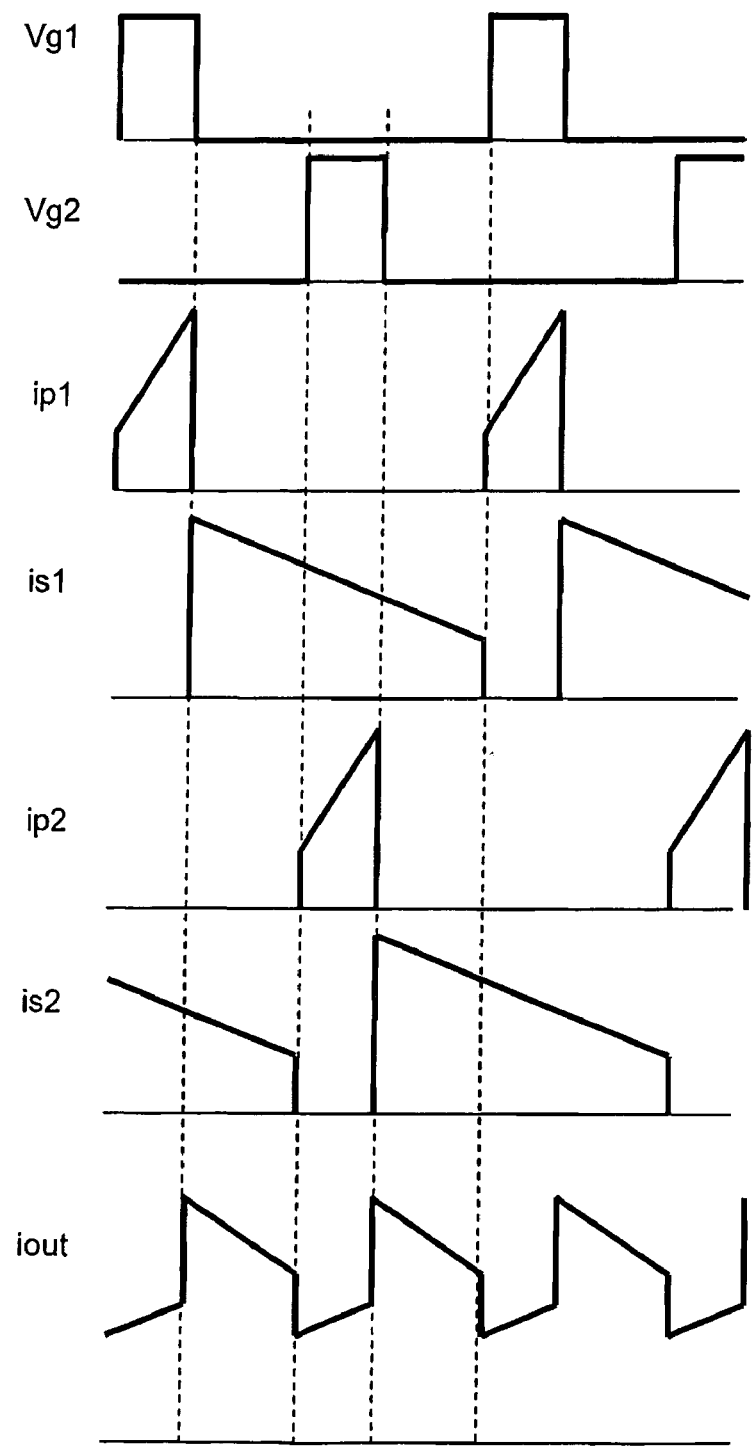
FIG. 3 shows a waveform diagram of the voltages across the switches, currents flowing through the primary and secondary windings, and the converter's output current of the interleaved flyback converter as shown in FIG. 2(b) respectively.
Figure 6:
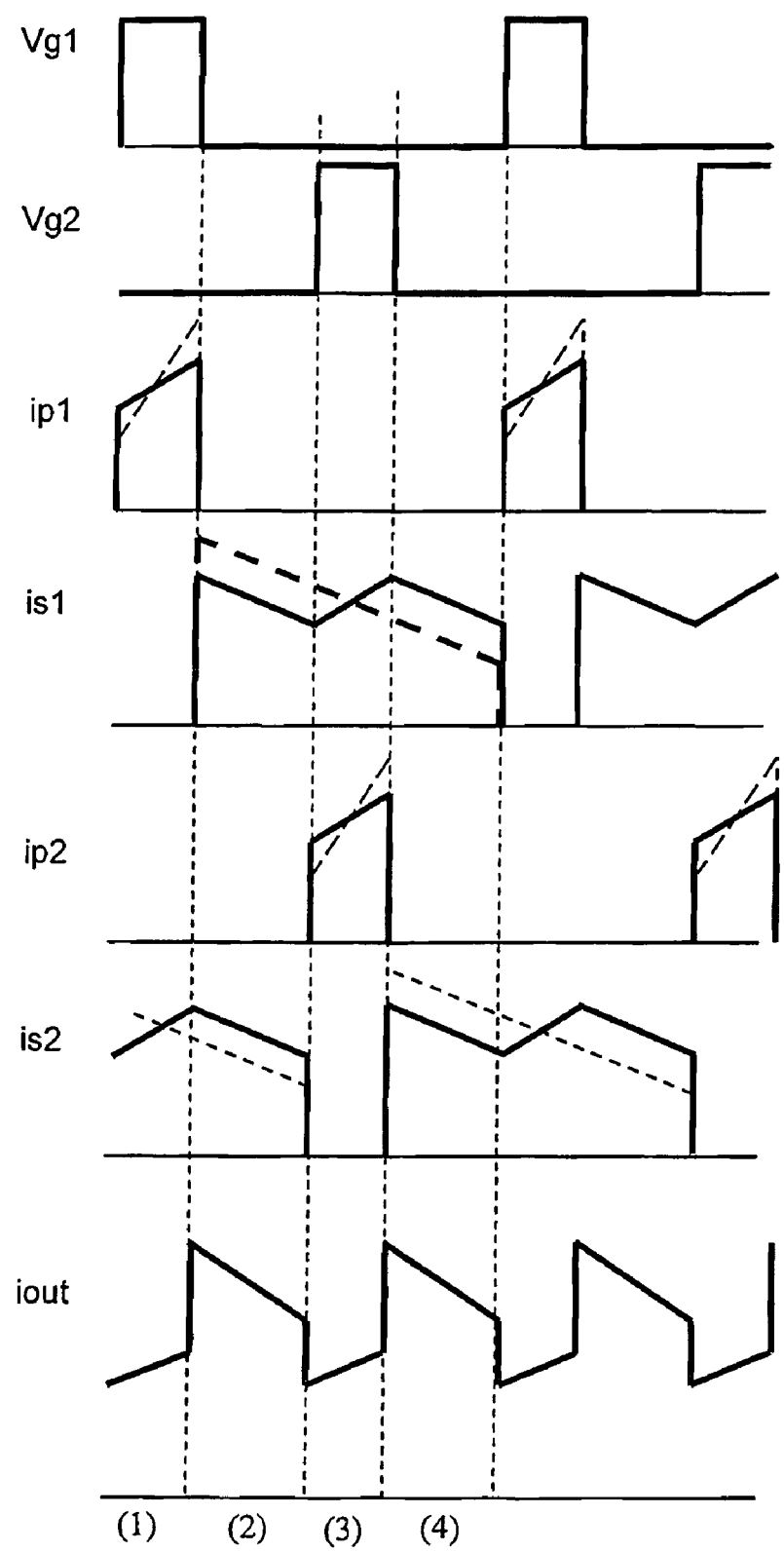
FIG. 6 shows a waveform diagram of the voltages across the switches, currents flowing through the primary and secondary windings, and the converter's output current of the two-phase interleaved flyback converter according to the first preferred embodiment of the present invention respectively.

FIG. 6 shows a waveform diagram of the voltages (Vg1 and Vg2) driving the switches (SW1 and SW2), currents (ip1, ip2, is1 and is2) flowing through the primary windings (Np1 and Np2) and the secondary windings (Ns1 and Ns2), and the converter's output current (iout) of the two-phase interleaved flyback converter (e.g., FIG. 4(b)) according to the first preferred embodiment of the present invention respectively. In which, the time periods of (1), (2), (3) and (4) are corresponding to the operational modes 1 to 4 of FIGS. 5(a) to 5(d). For a comparison, the dot-line portions of the waveform diagram of ip1, is1, ip2 and is2 respectively marked the corresponding portions of ip1, is1, ip2 and is2 in the waveform diagram as shown in FIG. 3 respectively. During the time period of (1), the increasing variation rate of the current ip1 is decreased due to that the windings are coupled, and the ripples are decreased; the current is2 is increased, reversely the current is2 as shown in FIG. 3 is decreasing, that is because of the first and the second transformers T1 and T2 of the interleaved flyback converter in the prior art as shown in FIG. 2(b) are not coupled. During the time period of (2), the variation of the currents is1 and is2 (decreasing) has the same trend as that of the corresponding portion of the currents is1 and is2 of FIG. 3. During the time period of (3), the increasing variation rate of the current ip2 is decreased due to that each the primary winding and each the secondary winding of the present preferred embodiment are coupled, and the ripples are reduced, the current is1 is increased. During the time period of (4), the variation of the currents is1 and is2 (decreasing) has the same trend as that of the corresponding portion of the currents is1 and is2 of FIG. 3. In FIG. 6, peak values of currents ip1, is1, ip2 and is2 according to the present invention are obviously much lower than the corresponding portions of currents ip1, is1, ip2 and is2 as shown in FIG. 3.

Figure 7:
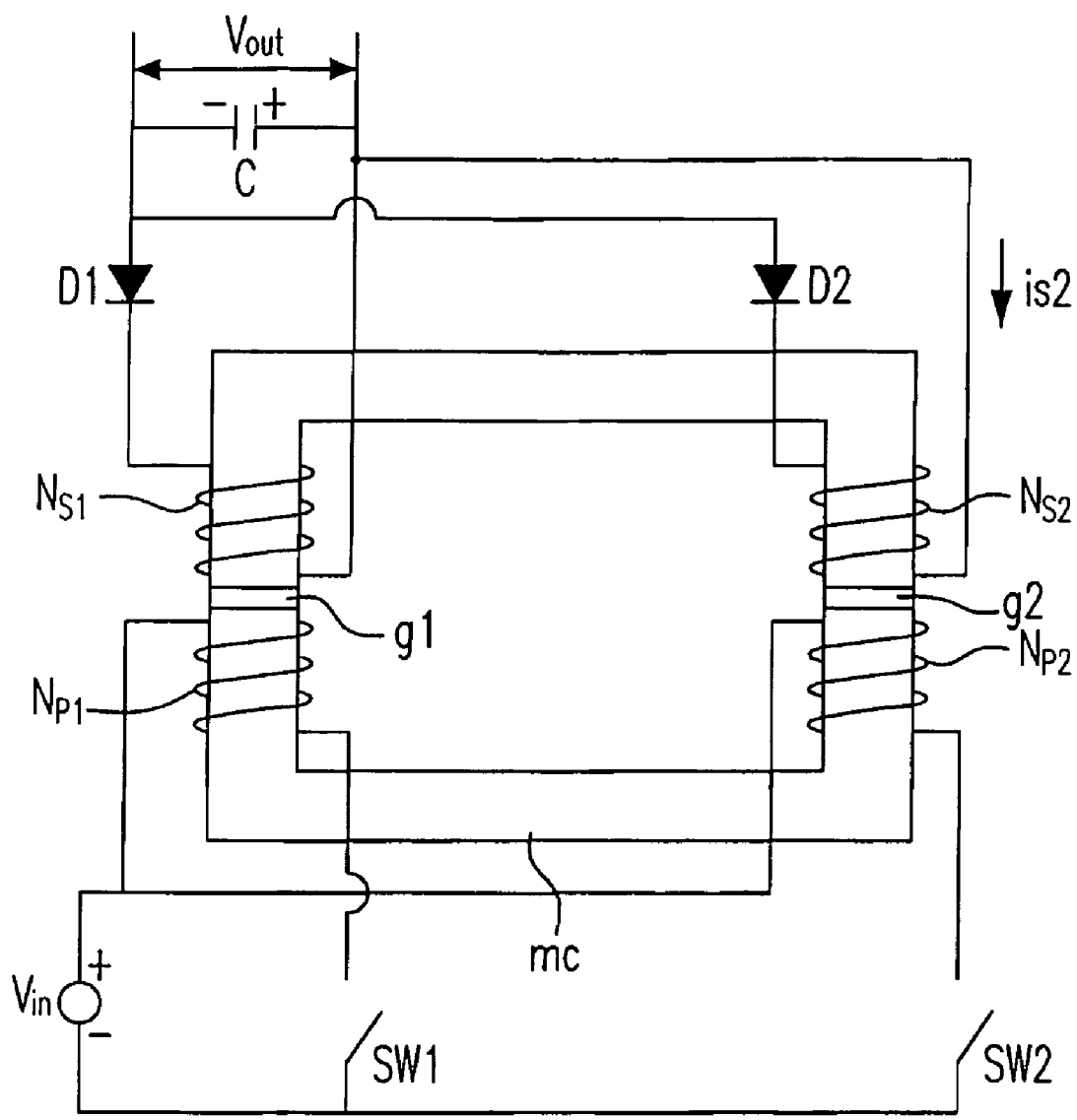
FIG. 7 shows a schematic circuit diagram of a two-phase interleaved flyback converter according to the second preferred embodiment of the present invention.
Figure 8A:
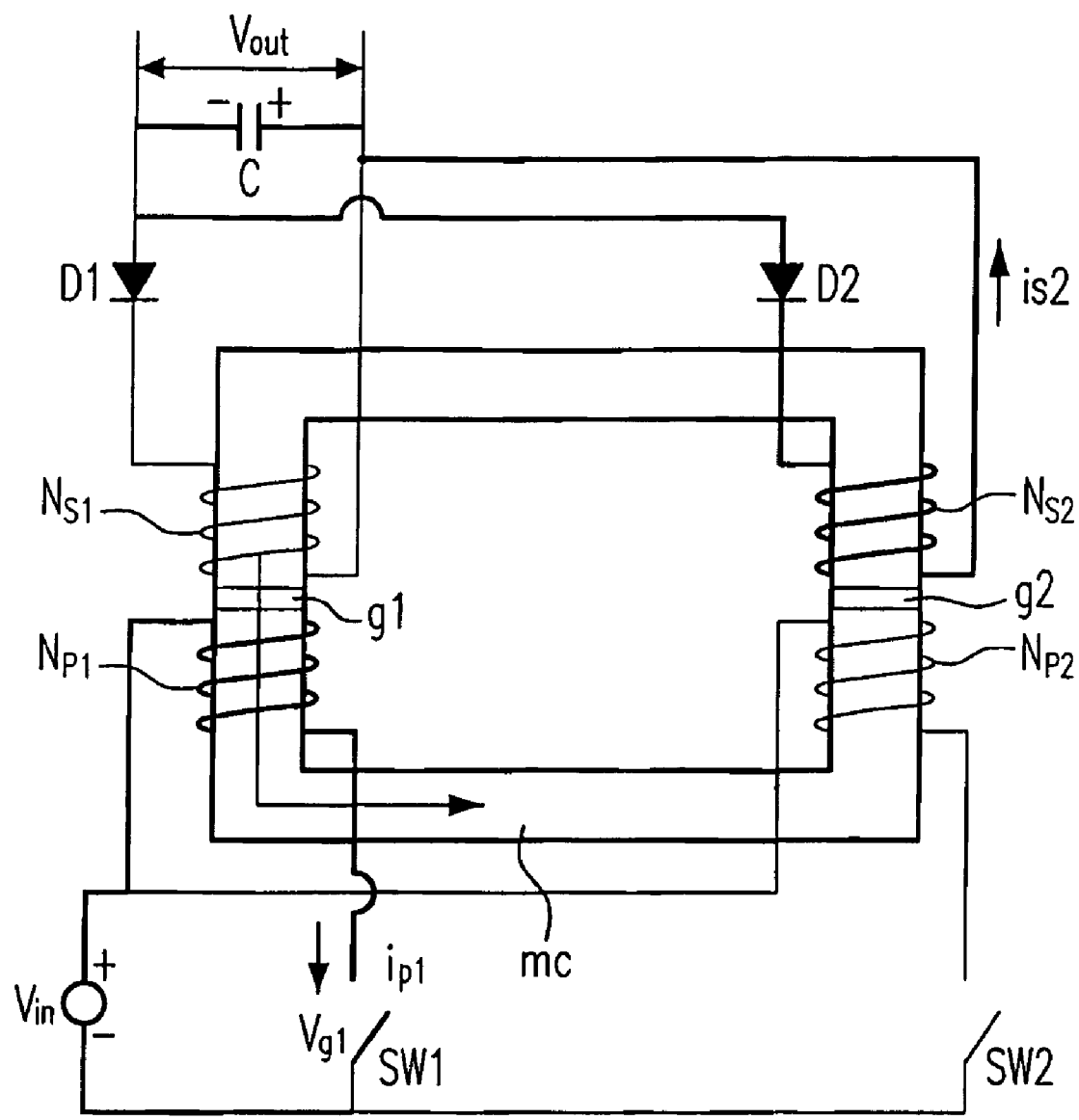
FIG. 8(a) shows a schematic circuit diagram of the two-phase interleaved flyback converter under the operational mode 1 according to the second preferred embodiment of the present invention.
Figure 8B:
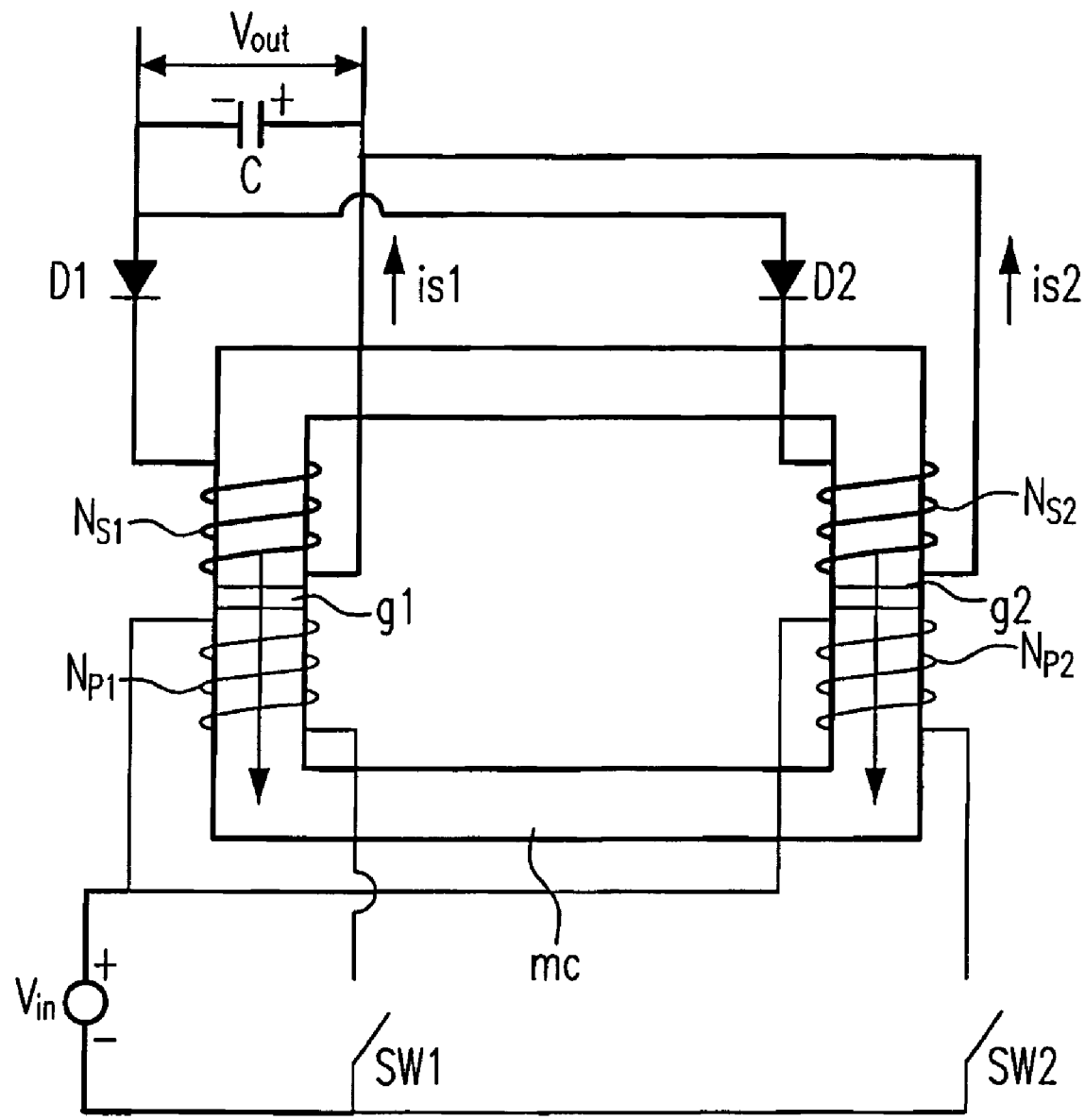
FIG. 8(b) shows a schematic circuit diagram of the two-phase interleaved flyback converter under the operational mode 2 according to the second preferred embodiment of the present invention.
Figure 8C:
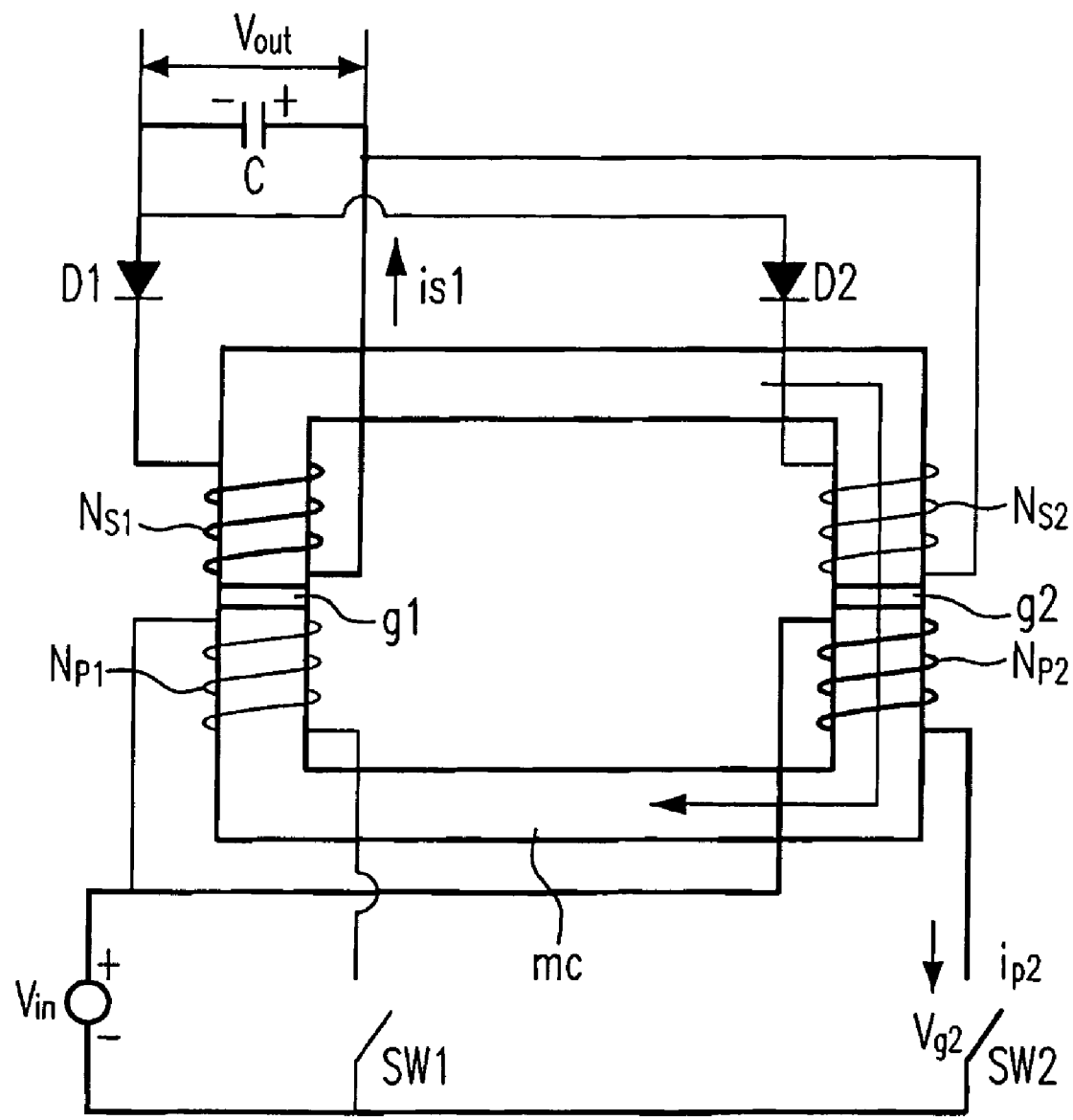
FIG. 8(c) shows a schematic circuit diagram of the two-phase interleaved flyback converter under the operational mode 3 according to the second preferred embodiment of the present invention.
Figure 8D:
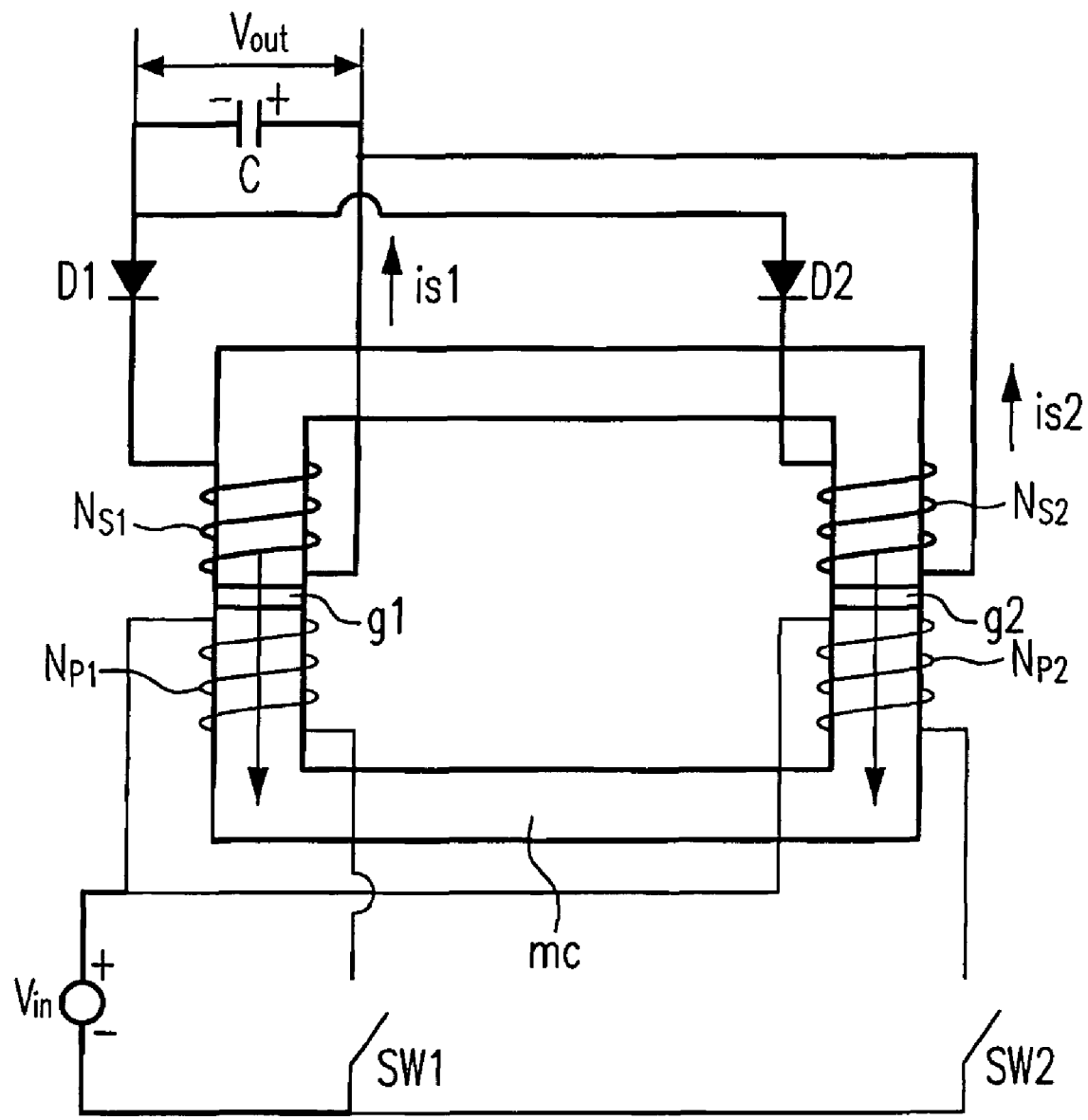
FIG. 8(d) shows a schematic circuit diagram of the two-phase interleaved flyback converter under the operational mode 4 according to the second preferred embodiment of the present invention.

FIG. 7 shows a schematic circuit diagram of a two-phase interleaved flyback converter according to the second preferred embodiment of the present invention, which differ from FIG. 4(a) in that the converter further includes a magnetic core mc having a first and a second core legs. In which, the first core leg is mounted with the first primary winding Np1 and the first secondary winding Ns1, each of the first and the second core legs has a respective air gap g1-g2, and the second core leg is mounted with the second primary winding Np2 and the second secondary winding Ns2.

FIGS. 8(a)-8(d) respectively show a schematic circuit diagram of the two-phase interleaved flyback converter under the operational modes 1-4 according to the second preferred embodiment of the present invention, which have the same operational principles as those of FIGS. 5(a)-5(d), the only difference between these two is that the second preferred embodiment of the present invention does not have the middle core leg of the first preferred embodiment of the present invention, and naturally the currents flowing through the middle core leg as shown in FIGS. 5(a)-5(d) are not existing in FIGS. 8(a)-8(d).

Figure 9:
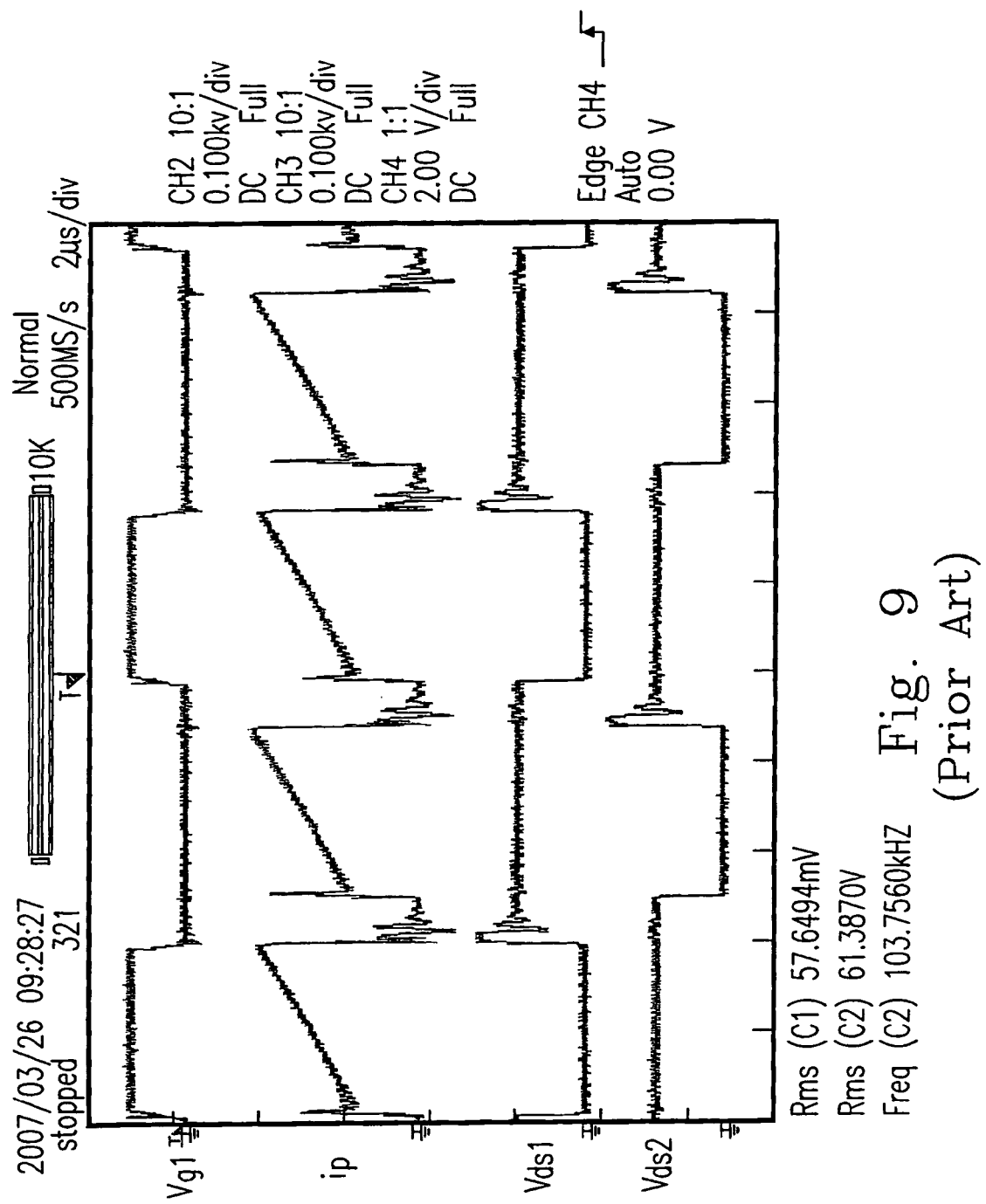
FIG. 9 shows a waveform diagram of the voltage across the first switch, the current sum of the first and second switches and the voltages across the first and second diodes of the two-phase interleaved flyback converter as shown in FIG. 2(b) respectively.

FIG. 9 shows a waveform diagram of the voltage (Vg1) across the first switch (SW1), the current sum ip (=ip1+ip2) of the first and second switches (SW1 and SW2) and the voltages (Vds1 and Vds2) across the first and second diodes (D1 and D2) of the two-phase interleaved flyback converter as shown in FIG. 2(b) respectively.

Figure 10:
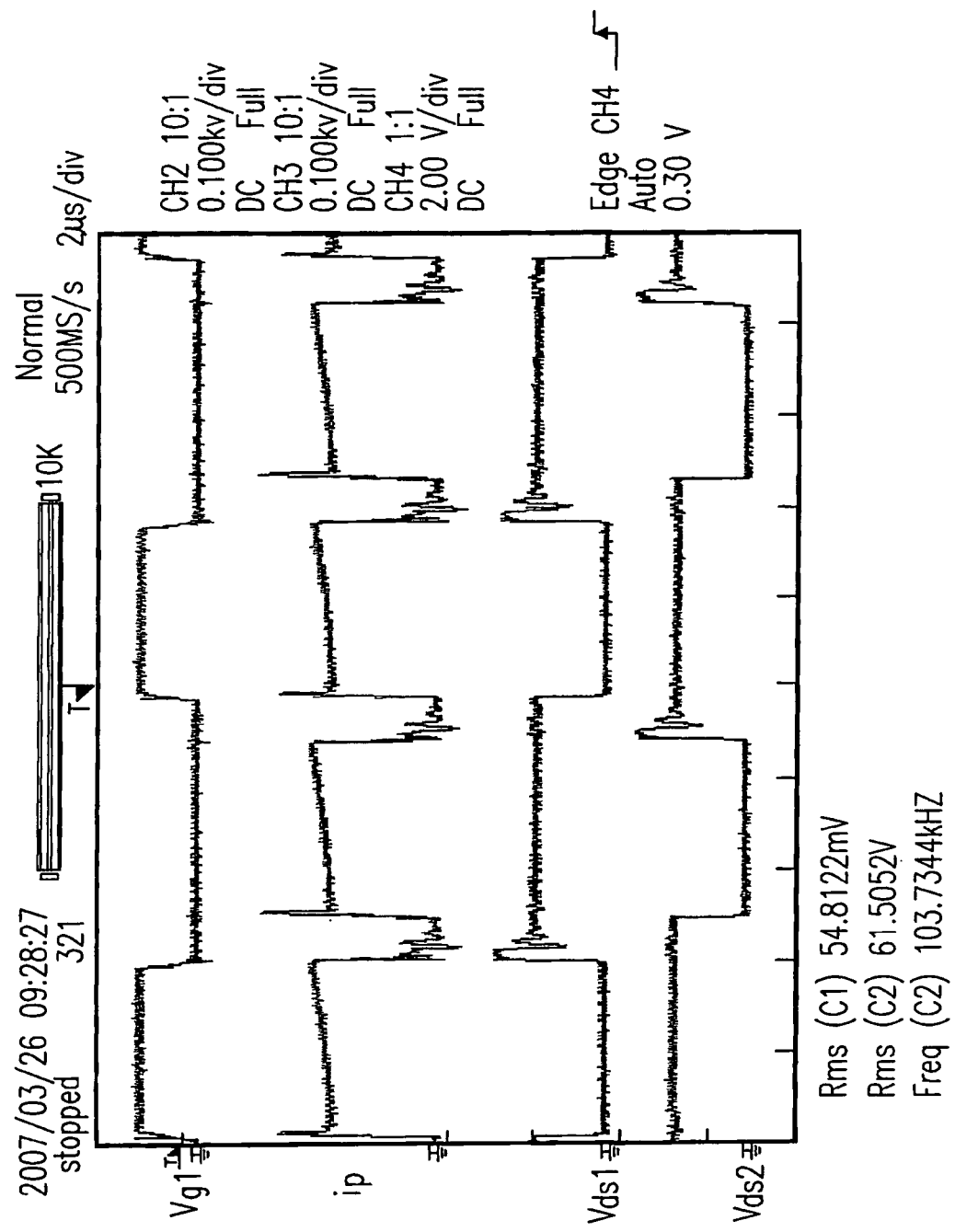
FIG. 10 shows a waveform diagram of the voltage across the first switch, the current sum of the first and second switches and the voltages across the first and second diodes of the two-phase interleaved flyback converter as shown in FIG. 4(b) respectively.

FIG. 10 shows a waveform diagram of the voltage (Vg1) across the first switch (SW1), the current sum ip (=ip1+ip2) of the first and second switches (SW1 and SW2) and the voltages (Vds1 and Vds2) across the first and second diodes (D1 and D2) of the two-phase interleaved flyback converter as shown in FIG. 4(b) respectively.

For the comparison of the current sum ip (=ip1+ip2) of the first and second switches (SW1 and SW2) in FIG. 10 and the current sum ip (=ip1+ip2) of the first and second switches (SW1 and SW2) in FIG. 9, the aforementioned formula could be employed: ic/inon-c=(0.5−D)/(1−D) =(0.5−0.36)/(1−0.36)=0.22 (the peak value of the ripple current of the ip curve is around 2.5 div in FIG. 10, and the peak value of the ripple current of the ip curve is around 11 div in FIG. 9). In FIG. 10, the peak value of the ripple current of the ip curve according to the first preferred embodiment of the present invention is decreased to ¼ of the peak value of the ripple current of the ip curve according to the two-phase interleaved flyback converter in the prior art as shown in FIG. 9, and the ripple is obviously eliminated.

Figure 11:
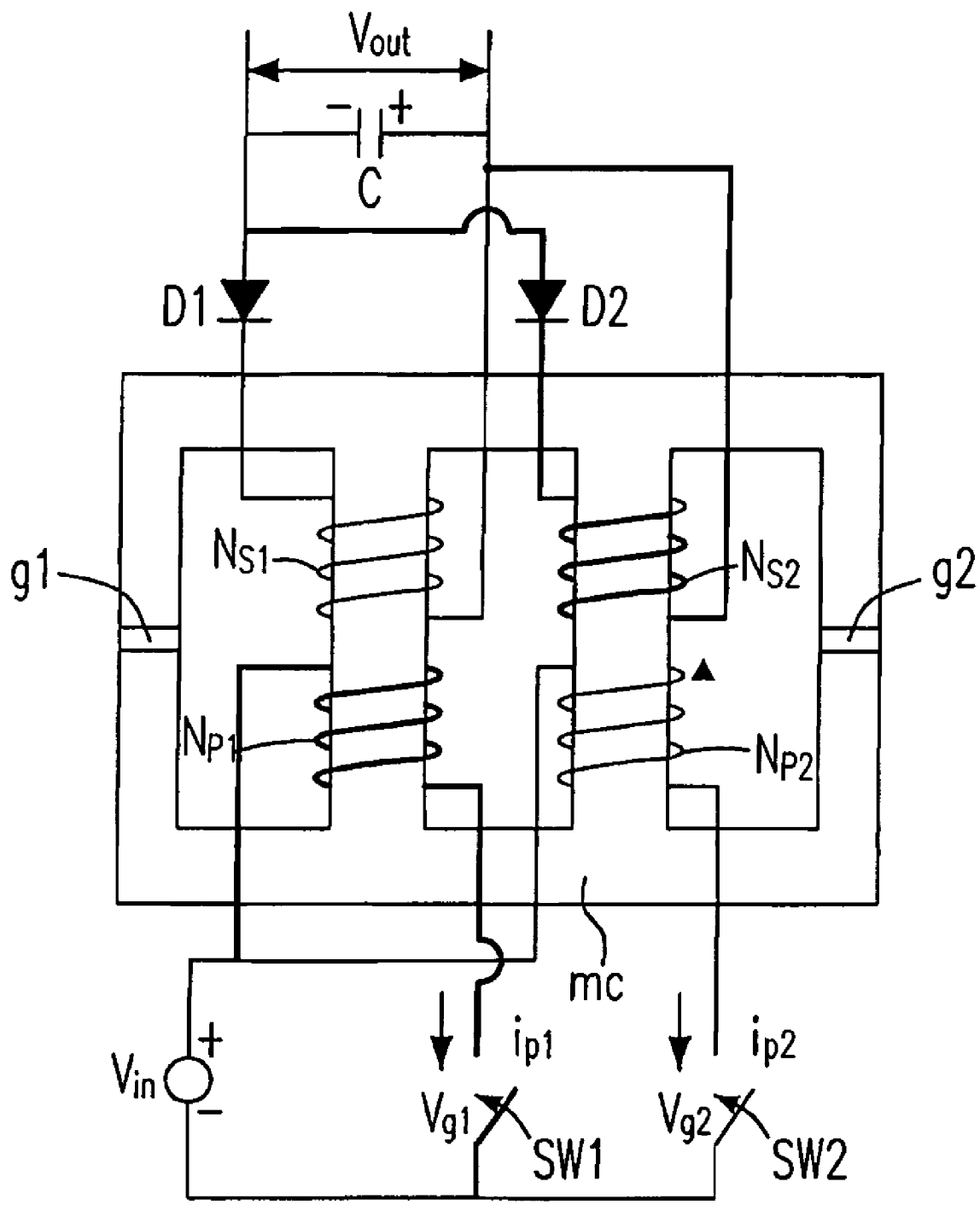
FIG. 11 shows a schematic circuit diagram of a two-phase interleaved flyback converter according to the third preferred embodiment of the present invention.

FIG. 11 shows a schematic circuit diagram of a two-phase interleaved flyback converter according to the third preferred embodiment of the present invention, which includes a magnetic core mc having four core legs, each of the first and the fourth core legs has a respective air gap g1-g2, the second core leg is mounted with the first primary winding Np1 and the first secondary winding Ns1, the third core leg is mounted with the second primary winding Np2 and the second secondary winding Ns2, and the remaining portion is the same as that of the first preferred embodiment of the present invention (as shown in FIG. 4(b)).

Figure 12:
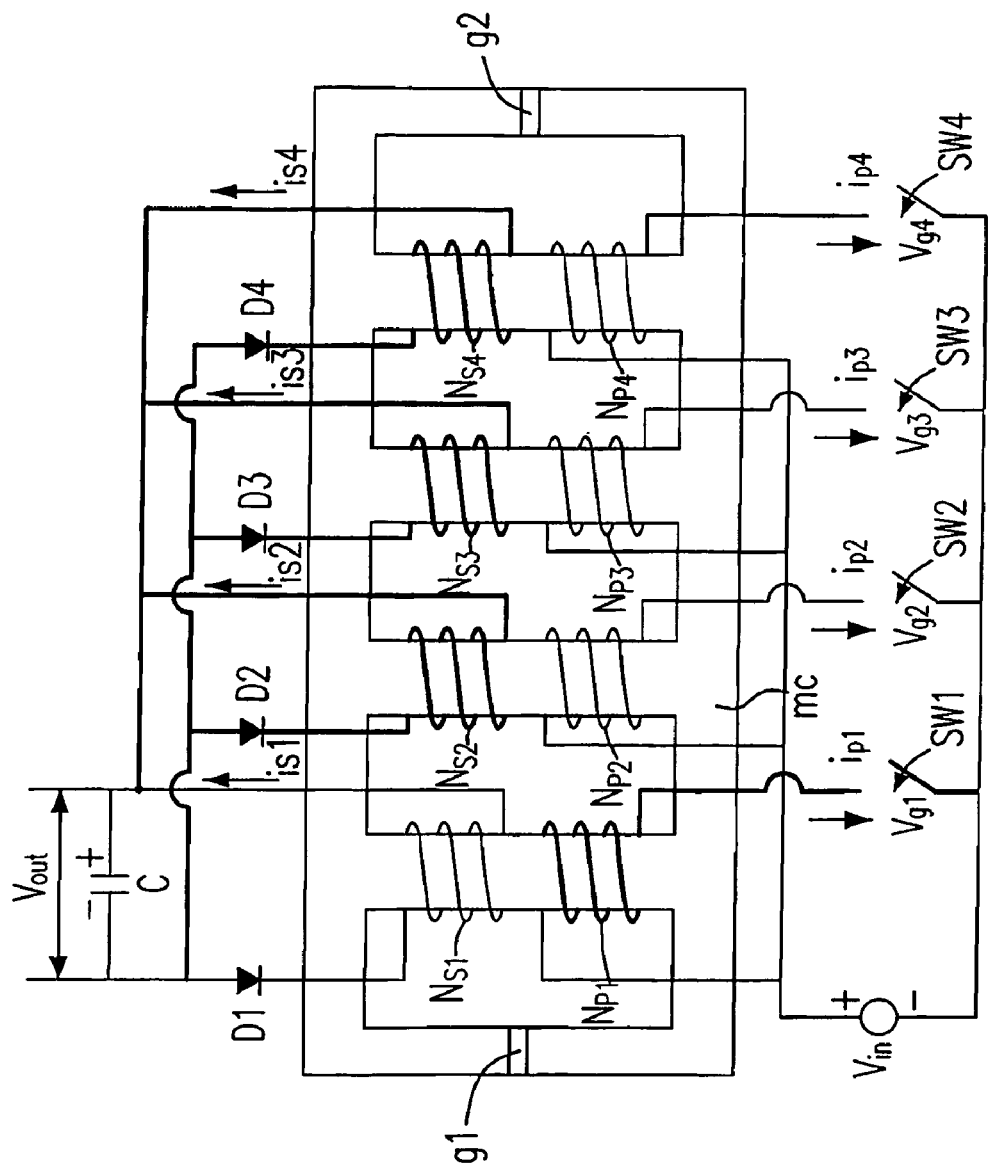
FIG. 12 shows a schematic circuit diagram of a four-phase interleaved flyback converter having a single magnetic core with six core legs and two air gaps according to the fourth preferred embodiment of the present invention.

According to a further aspect of the present invention, it could also be applied to a multiphase interleaved flyback converter. For example, FIG. 12 shows a schematic circuit diagram of a four-phase interleaved flyback converter having a single magnetic core with six core legs and two air gaps according to the fourth preferred embodiment of the present invention, which includes a magnetic core mc having six core legs, each of the first and the sixth core legs has a respective air gap g1-g2, the second core leg is mounted with the first primary winding Np1 and the first secondary winding Ns1, the third core leg is mounted with the second primary winding Np2 and the second secondary winding Ns2, the fourth core leg is mounted with the third primary winding Np3 and the third secondary winding Ns3, the fifth core leg is mounted with the fourth primary winding Np4 and the fourth secondary winding Ns4, it further comprises the first to the fourth switches SW1 to SW4 (currents flow through the primary windings are ip1-ip4) and the first to the fourth diodes D1-D4 (currents flow through the secondary windings are is1-is4), the first terminal of the first primary winding Np1 has a polarity the same as that of any of the first terminal of the first secondary winding Ns1, the second terminal of the second primary winding Np2, the second terminal of the second secondary winding Ns2, the second terminal of the third primary winding Np3, the second terminal of the third secondary winding Ns3, the second terminal of the fourth primary winding Np4 and the second terminal of the fourth secondary winding Ns4, and the remaining portion is the same as that of the third preferred embodiment of the present invention (as shown in FIG. 11).

Figure 13:
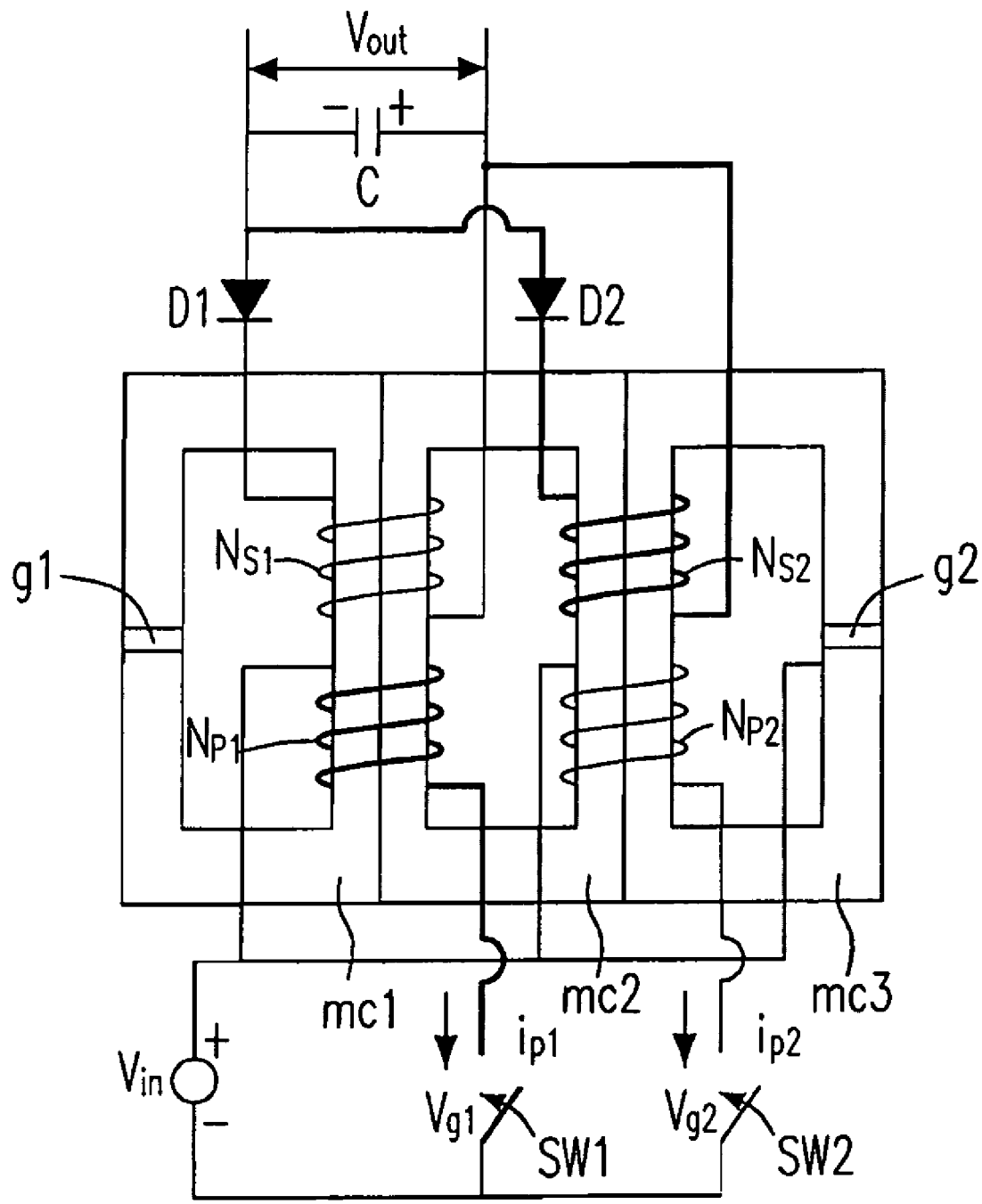
FIG. 13 shows a schematic circuit diagram of a two-phase interleaved flyback converter having three magnetic cores and two air gaps according to the fifth preferred embodiment of the present invention.

Surely, according to a still further aspect of the present invention, it could also be applied to one of a two-phase interleaved flyback converter and a multiphase interleaved flyback converter, each of which has a plurality of magnetic cores (e.g., it could be a EE magnetic core, or a UU magnetic core, or a EE+UU magnetic core). For example, FIG. 13 shows a schematic circuit diagram of a two-phase interleaved flyback converter having a core device including three magnetic cores and two air gaps according to the fifth preferred embodiment of the present invention. In which, each of a first, a second and a third magnetic cores, mc1, mc2 and mc3, is a UU magnetic core having two core legs, each of the first core leg of the magnetic core mc1 and the second core leg of the magnetic core mc3 has a respective air gap g1-g2, the first primary winding Np1 and the first secondary winding Ns1 are mounted on the second core leg of the first magnetic core mc1 and the first core leg of the second magnetic core mc2, the second primary winding Np2 and the second secondary winding Ns2 are mounted on the second core leg of the second magnetic core mc2 and the first core leg of the third magnetic core mc3, and the remaining portion is the same as that of the third preferred embodiment of the present invention (as shown in FIG. 11). The present embodiment can easily be fulfilled, because the core device could be assembled by several individual simple cores mc1, mc2 and mc3, and hence reduce the manufacture cost.

Figure 14:
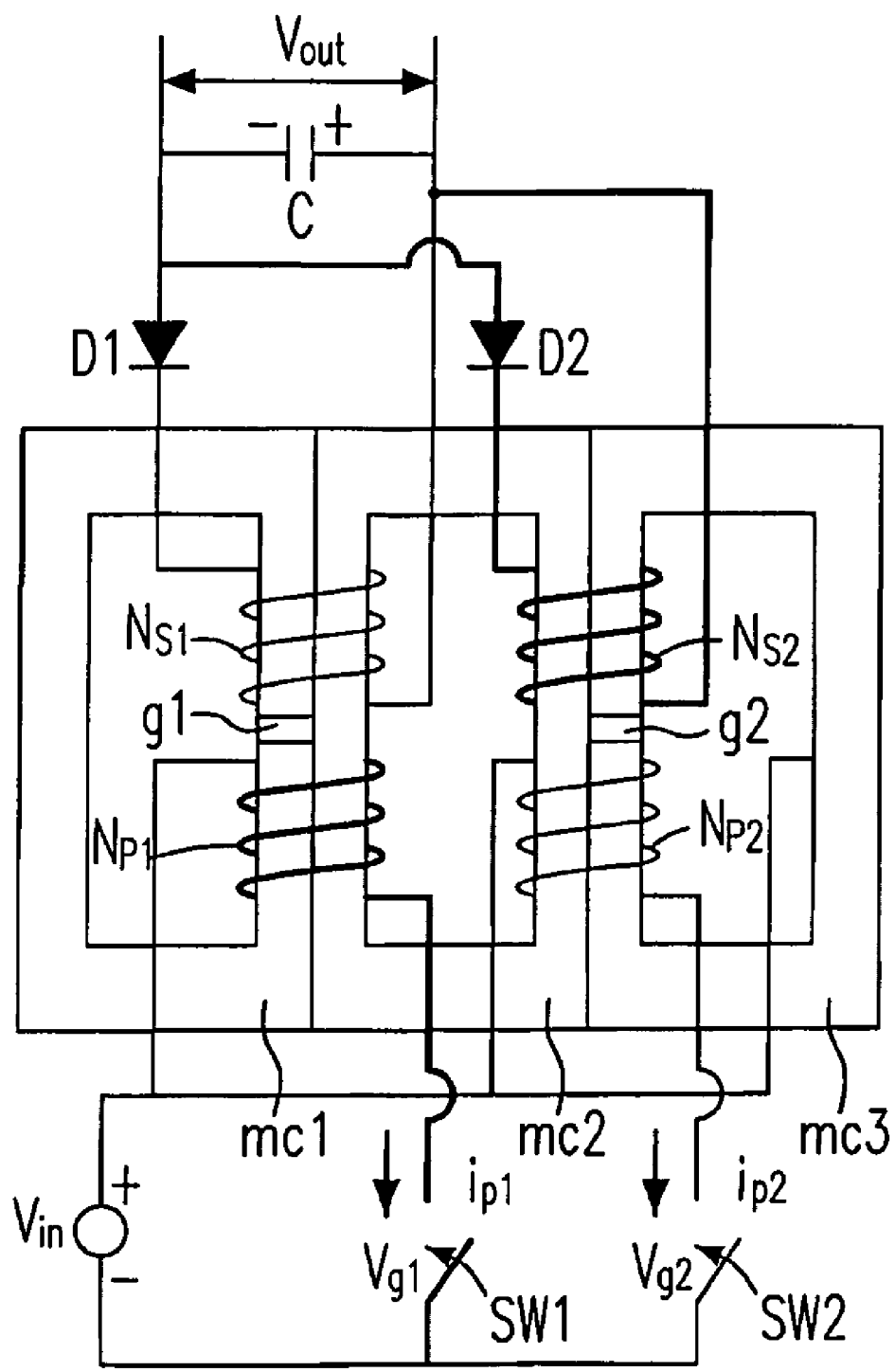
FIG. 14 shows a schematic circuit diagram of a two-phase interleaved flyback converter having three magnetic cores and two air gaps according to the sixth preferred embodiment of the present invention.

FIG. 14 shows a schematic circuit diagram of a two-phase interleaved flyback converter having a core device including three magnetic cores and two air gaps according to the sixth preferred embodiment of the present invention. In which, each of a first, a second and a third magnetic cores mc1, mc2 and mc3 is a UU magnetic core having two core legs, each of the second core leg of the magnetic core mc1 and the first core leg of the magnetic core mc3 has a respective air gap g1-g2, the first primary winding Np1 and the first secondary winding Ns1 are mounted on the second core leg of the first magnetic core mc1 and the first core leg of the second magnetic core mc2, the second primary winding Np2 and the second secondary winding Ns2 are mounted on the second core leg of the second magnetic core mc2 and the first core leg of the third magnetic core mc3, and the remaining portion is the same as that of the third preferred embodiment of the present invention (as shown in FIG. 11). The present embodiment can improve stray leakage flux because the air gap of mc3 is surrounded by windings Ns2 and Np2.

Figure 15:
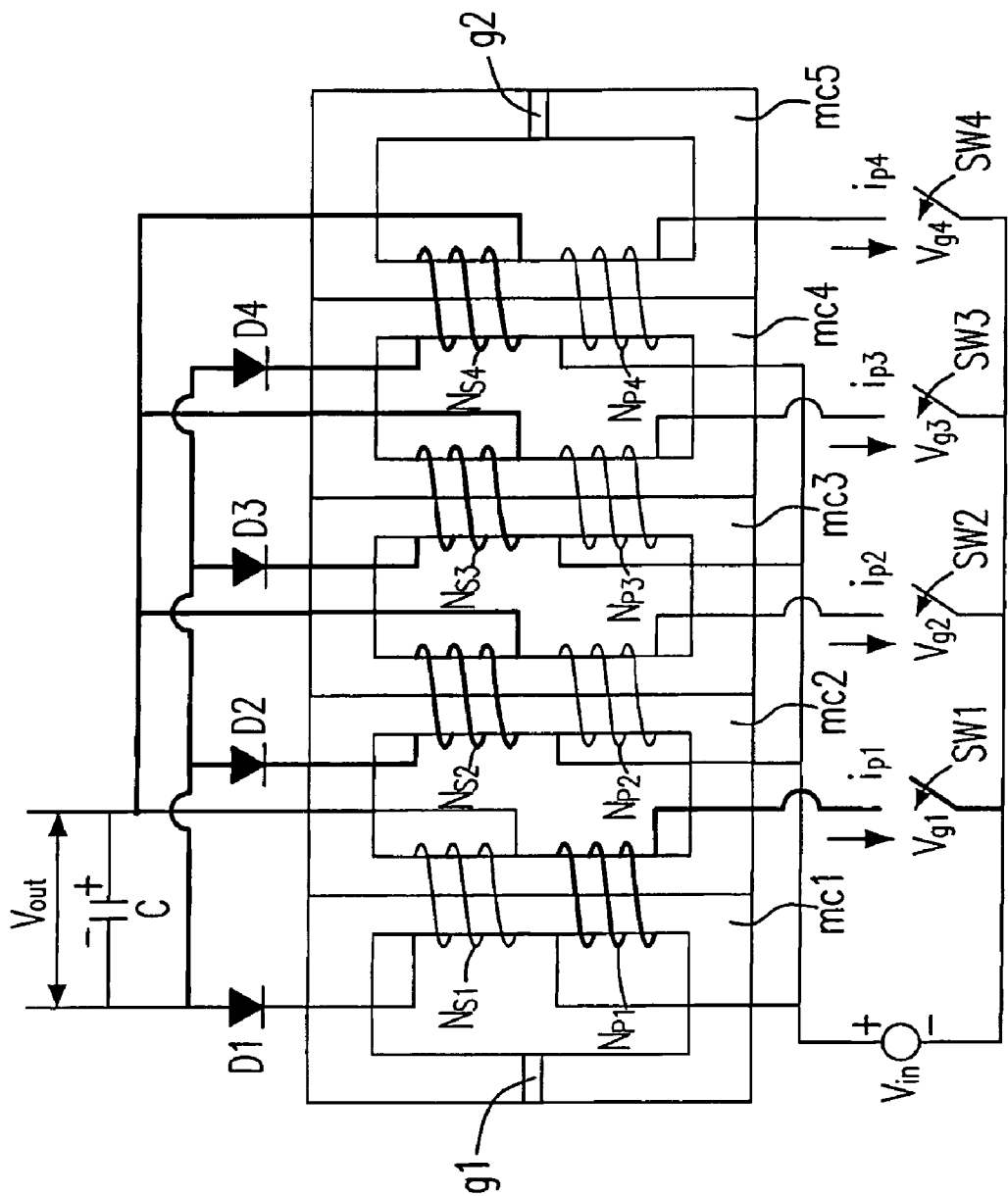
FIG. 15 shows a schematic circuit diagram of a four-phase interleaved flyback converter having five magnetic cores and two air gaps according to the seventh preferred embodiment of the present invention.

FIG. 15 shows a schematic circuit diagram of a four-phase interleaved flyback converter having a core device including five magnetic cores and two air gaps according to the seventh preferred embodiment of the present invention. In which, each of a first to a fifth magnetic cores mc1-mc5 is a UU magnetic core having two core legs, each of the first core leg of the magnetic core mc1 and the second core leg of the magnetic core mc5 has a respective air gap g1-g2, the first primary winding Np1 and the first secondary winding Ns1 are mounted on the second core leg of the first magnetic core mc1 and the first core leg of the second magnetic core mc2, the second primary winding Np2 and the second secondary winding Ns2 are mounted on the second core leg of the second magnetic core mc2 and the first core leg of the third magnetic core mc3, the third primary winding Np3 and the third secondary winding Ns3 are mounted on the second core leg of the third magnetic core mc3 and the first core leg of the fourth magnetic core mc4, the fourth primary winding Np4 and the fourth secondary winding Ns4 are mounted on the second core leg of the fourth magnetic core mc4 and the first core leg of the fifth magnetic core mc5, and the remaining portion is the same as that of the fourth preferred embodiment of the present invention (as shown in FIG. 12).

According to still another aspect of the present invention, it could also be applied to a multiphase interleaved flyback converter having a magnetic core (having a plurality of core legs) and an air gap (it could also have a plurality of air gaps).

According to the aforementioned descriptions, a multiphase interleaved flyback converter and a controlling method thereof are provided to further enhance the original functions of the interleaved flyback converter and to increase the power level of its application occasions so as to dramatically decrease the fringing losses, increase the utilization ratio of the magnetic core, and keep the original advantage of having the parallelized multi-channel of the interleaved flyback converter.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A two-phase interleaved flyback converter, comprising:
an output capacitor having a first and a second terminals;
a transformer comprising:
   a first primary winding having a first terminal selectively connected to a DC power source and a second terminal;
   a first secondary winding having a first terminal connected to the output capacitor via a first switch and a second terminal;
   a second primary winding having a first terminal and a second terminal selectively connected to the DC power source;
   a second secondary winding having a first terminal and a second terminal connected to the output capacitor via a second switch; and
a magnetic coupled core device, wherein the first primary, the first secondary, the second primary and the second secondary windings are wound therein, and the first terminal of the first primary winding has a polarity the same to any of the first terminal of the first secondary winding, the first terminal of the second primary winding and the second terminal of the second secondary winding so as to eliminate a ripple of a channel current of the converter;
a first main circuit of a first flyback converter, comprising:
   the first primary winding;
   the first secondary winding;
   the first switch having a first and a second terminals; and
   a first diode having an anode and a cathode; and
a second main circuit of a second flyback converter, comprising:
   the second primary winding;
   the second secondary winding;
   the second switch having a first and a second terminals; and
   a second diode having an anode and a cathode, wherein the second terminal of the first primary winding is coupled to the first terminal of the first switch, the second terminal of the first switch is grounded, the first terminal of the second primary winding is coupled to the first terminal of the first primary winding, the second terminal of the second primary winding is coupled to the first terminal of the second switch, the second terminal of the second switch is grounded, the first terminal of the first secondary winding is coupled to the cathode of the first diode, the anode of the first diode is coupled to the first terminal of the output capacitor, the second terminal of the first secondary winding is coupled to the second terminal of the output capacitor, the first terminal of the second secondary winding is coupled to the cathode of the second diode, the anode of the second diode is coupled to the first terminal of the output capacitor, and the second terminal of the second secondary winding is coupled to the second terminal of the output capacitor.

2. A converter according to claim 1, wherein the first terminal of the output capacitor is grounded.

3. A converter according to claim 2, wherein the first terminals of the first and the second primary windings receive a DC input voltage, and the output capacitor outputs an output voltage.

4. A converter according to claim 1, wherein the core device comprises a magnetic core having a first and a second core legs, the first core leg is mounted with the first primary and the first secondary windings, the first core leg has a first air gap, the second core leg has a second air gap, and the second core leg is mounted with the second primary and the second secondary windings.

5. A converter according to claim 1, wherein the core device comprises a magnetic core having a first to a third core legs, the first core leg is mounted with the first primary and the first secondary windings, the first core leg has the first air gap, the second core leg has the second air gap, the third core leg has the third air gap, and the third core leg is mounted with the second primary and the second secondary windings.

6. A converter according to claim 1, wherein the core device comprises a magnetic core having a first to a fourth core legs, the second core leg is mounted with the first primary and the first secondary windings, the third core leg is mounted with the second primary and the second secondary windings, and the first core leg has a first air gap and the fourth core leg has a second air gap for storing energies transmitted by the transformer.

7. A converter according to claim 1, wherein the core device comprises two magnetic cores, each of the magnetic cores has a first and a second core legs, the second core leg of the first magnetic core and the first core leg of the second magnetic core are mounted with the first primary and the first secondary windings, the second core leg of the second magnetic core is mounted with the second primary and the second secondary windings.

8. A converter according to claim 1, wherein the core device comprises a first to a third magnetic cores, each of the magnetic cores has a first and a second core legs, the second core leg of the first magnetic core and the first core leg of the second magnetic core are mounted with the first primary and the first secondary windings, the second core leg of the second magnetic core and the first core leg of the third magnetic core are mounted with the second primary and the second secondary windings, the second core leg of the first magnetic core has a first air gap, and the first core leg of the third magnetic core has a second air gap.

9. A converter according to claim 1, wherein the first switch has a first control signal and the second switch has a second control signal, and a phase-shift angle between the first and second control signals is 180 degrees.

10. A controlling method for a multiphase interleaved flyback converter, comprising the steps of:
providing the converter with a transformer having a plurality of primary windings, each of which has a first terminal selectively connected to a DC power source and a second terminal, a plurality of secondary windings, each of which has a first terminal connected to an output capacitor, having a first terminal and a second terminal, via a switch and a second terminal, and a plurality of main circuits of flyback converters, each of which has the primary and the secondary windings, the switch and a diode, having a first primary winding and a second primary winding, a first secondary winding and a second secondary winding, a first switch and a second switch, each of which has a first terminal and a second terminal, and a first diode and a second diode, each of which has an anode and a cathode;
causing the second terminal of the first primary winding coupled to the first terminal of the first switch, the second terminal of the first switch grounded, the first terminal of the second primary winding coupled to the first terminal of the first primary winding, the second terminal of the second primary winding coupled to the first terminal of the second switch, the second terminal of the second switch grounded, the first terminal of the first secondary winding coupled to the cathode of the first diode, the anode of the first diode coupled to the first terminal of the output capacitor, the second terminal of the first secondary winding coupled to the second terminal of the output capacitor, the first terminal of the second secondary winding coupled to the cathode of the second diode, the anode of the second diode coupled to the first terminal of the output capacitor, and the second terminal of the second secondary winding coupled to the second terminal of the output capacitor; and
making the first terminal of the primary winding of a first one of the flyback converters has a polarity the same as that of any of the first terminal of the secondary winding of the first one of the flyback converters and all the second terminals of the primary and the secondary windings of the remaining flyback converters so as to eliminate a ripple of a channel current of the transformer.

11. A method according to claim 10, wherein each of the plurality of main circuits further comprises at least one magnetic core having at least two core legs.

12. A method according to claim 10, wherein the converter is a two-phase interleaved flyback converter.

13. A two-phase interleaved flyback converter, comprising:
a first flyback converter having a first primary winding,
an output capacitor having a first terminal and a second terminal;
a first secondary winding, a first switch and a first diode; and
a second flyback converter having a second primary winding, a second secondary winding, a second switch and a second diode, wherein each of the primary and secondary windings and switches has a first terminal and a second terminal, each of the diodes has an anode and a cathode, the second terminal of the first primary winding is coupled to the first terminal of the first switch, the second terminal of the first switch is grounded, the first terminal of the second primary winding is coupled to the first terminal of the first primary winding, the second terminal of the second primary winding is coupled to the first terminal of the second switch, the second terminal of the second switch is grounded, the first terminal of the first secondary winding is coupled to the cathode of the first diode, the anode of the first diode is coupled to the first terminal of the output capacitor, the second terminal of the first secondary winding is coupled to the second terminal of the output capacitor, the first terminal of the second secondary winding is coupled to the cathode of the second diode, the anode of the second diode is coupled to the first terminal of the output capacitor, the second terminal of the second secondary winding is coupled to the second terminal of the output capacitor, and the second secondary winding of the second flyback converter generates an output current when a current on the first primary winding of the first flyback converter is relatively increased.

14. A converter according to claim 13 further comprising a magnetic core having a first and a second core legs, wherein the first primary and the first secondary windings are wound on the first core leg and the second primary and the second secondary windings are wound on the second core leg.

15. A converter according to claim 13, wherein each of the first and the second flyback converters further comprises:
a rectifier output circuit coupled between the respective secondary winding thereof and the output capacitor.

* * * * *